United States Patent [19]
Ueda et al.

[11] Patent Number: 5,377,295
[45] Date of Patent: Dec. 27, 1994

[54] SPEED CONTROLLER OF MOTOR

[75] Inventors: Eiji Ueda; Akihiko Nakamura, both of Osaka; Makoto Gotou, Nishinomiya, all of Japan

[73] Assignee: Matsushita Electric Industrial Co., Ltd., Osaka, Japan

[21] Appl. No.: 785,331

[22] Filed: Nov. 1, 1991

[30] Foreign Application Priority Data

Nov. 7, 1990 [JP] Japan .................................. 2-303579
Nov. 30, 1990 [JP] Japan .................................. 2-338167
Mar. 15, 1991 [JP] Japan .................................. 3-050991

[51] Int. Cl.$^5$ ............................................ A02P 5/00
[52] U.S. Cl. .................................. 388/815; 388/902; 388/907.5
[58] Field of Search .................. 388/809–815, 388/902, 907.5, 908, 906

[56] References Cited

U.S. PATENT DOCUMENTS

| | | | |
|---|---|---|---|
| 4,078,193 | 3/1978 | Anderson et al. | 388/815 |
| 4,554,492 | 4/1985 | Karpowicz et al. | 388/815 |
| 4,580,083 | 4/1986 | Omue et al. | 388/815 |
| 4,684,856 | 9/1987 | Kahkipuno | 388/820 |
| 4,755,729 | 7/1988 | Gotou | 348/906 |
| 4,789,961 | 12/1988 | Tindall | 364/928 |
| 4,821,168 | 4/1989 | Gotou | 364/183 |

FOREIGN PATENT DOCUMENTS

| | | |
|---|---|---|
| 62-89487 | 4/1987 | Japan . |
| 62-89488 | 4/1987 | Japan . |
| 62-210881 | 9/1987 | Japan . |

*Primary Examiner*—William M. Shoop, Jr.
*Assistant Examiner*—David Martin
*Attorney, Agent, or Firm*—Stevens, Davis, Miller & Mosher

[57] ABSTRACT

Disclosed is a speed controller of a motor which comprises a rotation sensor for generating an A.C. signal having a period in accordance with a rotating speed of a motor; speed detection device for effecting detection operations a plurality of times per round of the motor by the A.C. signal of the rotation sensor; compensation device for generating a control signal on the basis of a detection signal of the speed detection device; and driving device for driving the motor in accordance with the control signal of the compensation device; wherein the compensation device includes rotation error detection device for obtaining a rotation error responsive to the detection signal of the speed detection device; memory device for storing a memory value; memory output value generation device for generating a memory output value by the use of the memory value of the memory device; filter device for obtaining a calculation error from the rotation error; renewing and storing device for renewing and storing substantially sequentially the memory value of the memory device by a renewed value corresponding to a value obtained by calculating and synthesizing the calculation error and the memory output value whenever the speed detection device effects Q times detection operations; and control signal generation device for generating a control signal responsive to the rotation error of the memory output value.

105 Claims, 7 Drawing Sheets

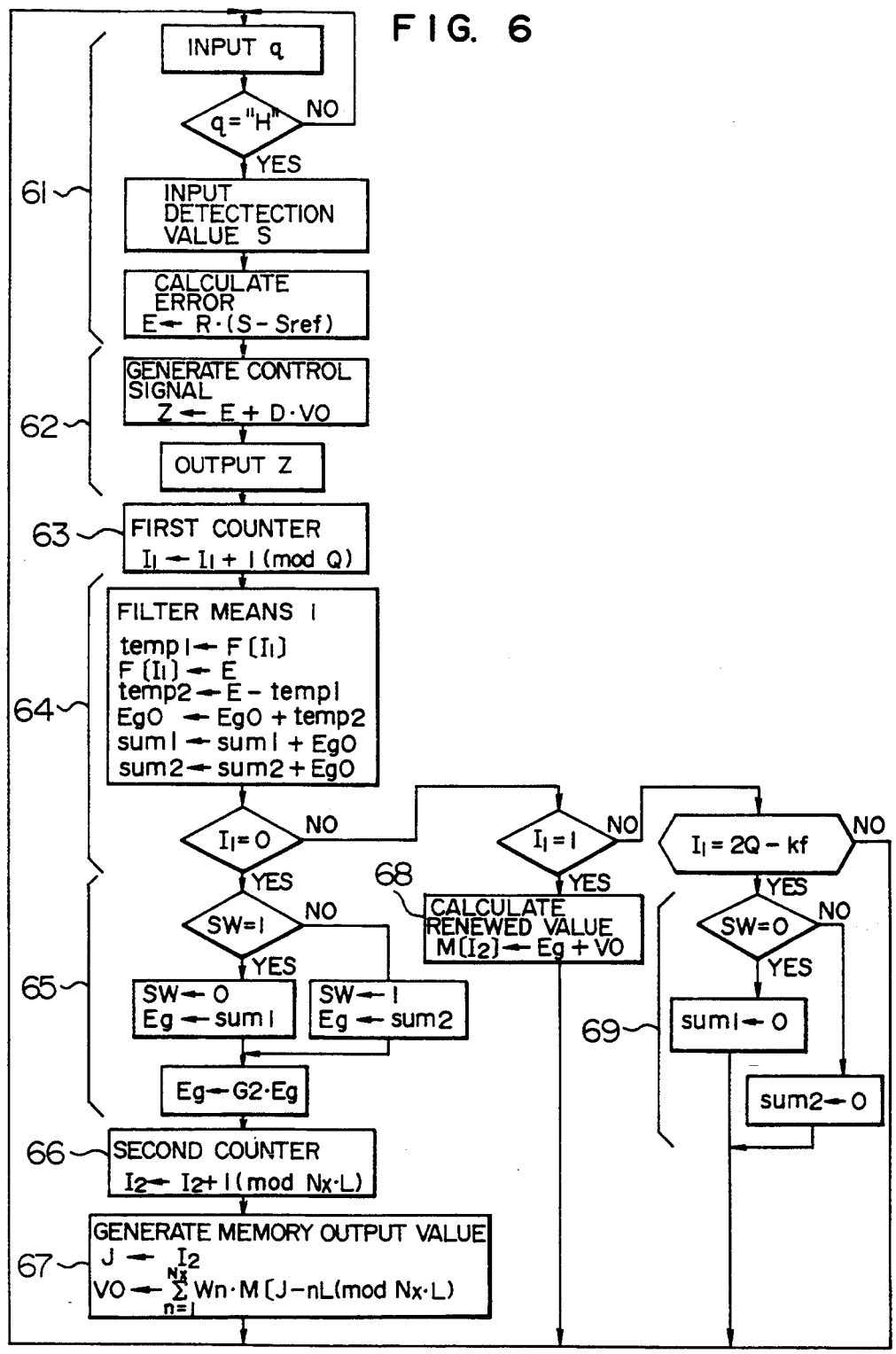
F I G. 6

TV : SAMPLING PERIOD OF TACHOMETER

SPEED CONTROLLER OF MOTOR

BACKGROUND OF THE INVENTION

1. Field of the Invention

This invention relates to a speed controller of a motor such as a capstan motor used in a video tape recorder, and so forth.

2. Description of the Related Art

A speed controller of a motor which detects a rotating speed of a motor by a tachometer and controls feed power to the motor by its detection signal has widely been used for a capstan motor of a Video tape recorder, and so forth. However, such a speed controller effects only proportional-integral control or differential control but has not been able to sufficiently suppress fluctuations of the rotating speed due to torque disturbances.

To solve such a problem, a speed controller of a motor having extremely high robustness against the torque disturbances has been proposed in JP-A-62-89487, JP-A-62-89488 and U.S. Pat. No. 4,821,168. Furthermore, JP-A-62-210881 and U.S. Pat. No. 4,755,729 propose a speed controller of a motor which drastically reduces the number of necessary memories and reduces also the calculation quantity necessary within one detection cycle of speed detection means. In other words, a speed control system is constituted by a rotation sensor for generating an A.C. signal having a period in accordance with the rotating speed of a motor, speed detection means for detecting a plurality of times detection operations per round of the motor by the A.C. signal of the rotation sensor, compensation means for generating a control signal on the basis of the detection signal of the speed detection means, and driving means for driving the motor in accordance with the control signal of the compensation means. Furthermore, the compensation means includes rotation error detection means for obtaining a rotation error responsive to the detection signal of the speed detection means, memory means for storing 4 or more memory values, memory output value generation means for generating a memory output value by the use of at least one memory value stored in the memory means, synthetic error generation means for generating a synthetic error by synthesizing a plurality of rotation errors of the rotation error detection means, renewing and storing means for renewing and storing substantially sequentially the memory values of the memory means by a renewed value corresponding to a value obtained by calculating and synthesizing the memory output value of the memory output value generation means and the synthetic error of the synthetic error generation means, and control signal generation means for generating a control signal by calculating and synthesizing the memory output value of the memory output value generation means and the rotation error of the rotation error detection means, wherein the control signal generation means generates a new control signal whenever the speed detection means generates a new detection signal, the renewing and storing means renews substantially one memory value whenever the speed detection means obtains Q new detection signals (where Q is an integer of 2 or more), and the operations of at least the memory output value generation means and renewing and storing means are substantially different from each other with respect to the timing of the detection signal of the speed detection means. In this way, the reference accomplishes an economical speed controller of a motor having high performance.

The speed controller of the motor disclosed in JP-A-62-210881 and U.S. Pat. No. 4,755,729 can certainly reduce drastically the number of necessary memories but in order to accomplish more economically this high performance speed controller, it is essentially necessary to further reduce the number of necessary memories. Since the operation of the synthetic error generation means includes a large number of multiplication operations, it has been necessary in the past to use an expensive high speed multiplier so as to make high speed calculation and to complete predetermined calculations within the detection cycle of the tachometer. In other words, various limitations have yet been left unsolved in connection with the construction and operation speeds of hardwares for accomplishing the compensation means.

SUMMARY OF THE INVENTION

It is an object of the present invention to provide a speed controller of a motor which drastically reduces the capacity of necessary memories and mitigates the limitations of the calculation time.

To accomplish the object described above, a speed controller of a motor in accordance with the present invention comprises rotation sensor means for generating an A.C. signal having a period corresponding to a rotating speed of a motor, speed detection means for effecting detection operations a plurality of times per round of the motor by the A.C. signal of the rotation sensor means, compensation means for generating a control signal on the basis of the detection signal of the speed detection means, and driving means for driving the motor in accordance with the control signal of the compensation means, wherein the compensation means includes rotation error detection means for obtaining a rotation error responsive to the detection signal of the speed detection means, memory means for storing at least 4 memory values having a bit length shorter than the bit length of the rotation error of the rotation error detection means or the bit length of the control signal of the control signal generation means, memory output value generation means for generating a memory output value by the use of at least one memory value stored in the memory means, synthetic error generation means for generating a synthetic error by synthesizing a plurality of rotation errors of the rotation error detection means, renewing and storing means for renewing and storing substantially sequentially the memory values of the memory means by a renewed value corresponding to a value obtained by calculating and synthesizing the memory output value of the memory output value generation means and the synthetic error of the synthetic error generation means whenever the speed detection means effects the detection operations Q times (where Q is an integer of 2 or more), and control signal generation means for generating a control signal responsive to the memory output value of the memory output value generation means and the rotation error of the rotation error detection means.

According to the construction described above, extremely high robustness can be obtained against specific frequency components of torque disturbances applied to the motor in the same way as in the speed controllers of a motor disclosed in JP-A-62-210881 and U.S. Pat. No. 4,755,729. Furthermore, in the construction described above, the bit length of the memory value of the memory means having a large number of memory values is made to be shorter than the bit length of the rotation error of the rotation error detection means or the bit length of the control signal of the control signal generation means. Accordingly, drastic reduction of the memory capacity can be made and a high performance speed controller of a motor can be constituted economically.

To accomplish the object described above, the speed controller of a motor in accordance with the present invention comprises rotation sensor means for generating an A.C. signal having a period in accordance with the rotating speed of the motor, speed detection means for effecting detection a plurality of times per round of the motor by the A.C. signal from the rotation sensor means, compensation means for generating a control signal on the basis of the detection signal of the speed detection means, and driving means for driving the motor in accordance with the control signal of the compensation means, wherein the compensation means comprises rotation error detection means for obtaining a rotation error corresponding to the detection signal of the speed detection means, memory means for storing at least 4 memory values, memory output value generation means for generating memory output values by the use of at least one memory value stored in the memory means, filter means for obtaining a calculation error by the use of a filter the transmission function of which can be divided by a transmission function $Ha(z^{-1})$ expressed by the formula $$Ha(z^{-1}) = \frac{1 - z^{-P}}{1 - z^{-1}}$$

or $$Ha(z^{-1}) = \frac{1 - z^{-P}}{1 - z^{-1}} \sum_{i=0}^{kf-1} z^{-i}$$

[where $z^{-1}$ is a delay of one sampling time, $z^{-P}$ is a delay of P sampling time (with the proviso that P is an integer of 2 or more), $z^{-i}$ is a delay of i sampling time and kf is a constant of an integer of 2 or more], renewing and storing means for renewing and storing substantially sequentially the memory value of the memory means by a renewed value corresponding to the value obtained by calculating and synthesizing the calculation error of the filter means and the memory output value of the memory output value generation means whenever the detection operations of the speed detection means are made Q times (where Q is an integer of 2 or more), and control signal generation means for generating a control signal responsive to the memory output value of the memory output value generation means and to the rotation error of the rotation error detection means. Here, the fact that the transmission function of the filter means can be divided by the transmission function $Ha(z^{-1})$ is equivalent to that the transmission function of the filter means includes $Ha(z^{-1})$ as its factor.

According to the construction described above, extremely high robustness against specific frequency components of torque disturbances applied to the motor can be obtained in the same way as the speed controller of a motor described in JP-A-62-210881 and U.S. Pat. No. 4,755,729 described already. Furthermore, the construction described above can reduce the number of multiplications in the calculation of the filter of the filter means (corresponding to the synthetic error generation means of the prior patent application) and can considerably mitigate the limitations imposed on the calculation time.

Furthermore, in order to accomplish the object already described, the speed controller of a motor of the present invention comprises rotation sensor means for generating an A.C. signal having a period in accordance with the rotating speed of a motor, speed detection means for effecting detection operations a plurality of times per round of the motor by the A.C. signal of the rotation sensor means, compensation means for generating a control signal by first and second calculation means operating substantially concurrently with each other, and driving means for driving the motor in accordance with the control signal of the compensation means, wherein the first calculation means includes rotation error detection means for obtaining a rotation error in accordance with the detection signal of the speed detection means, control signal generation means for generating a control signal by calculating and synthesizing the memory output value and the rotation error of the rotation error detection means, and operation timing generation means for generating a timing signal of the second calculation means, and wherein the second calculation means includes memory means for storing 4 or more memory values, memory output value generation means for generating a memory output value by the use of at least one memory value stored in the memory means, synthetic error generation means for generating a synthetic error by synthesizing a plurality of rotation errors of the rotation error detection means, renewing and storing means for renewing and storing substantially sequentially the memory values of the memory means by a renewed value corresponding to a value obtained by calculating and synthesizing the memory output value of the memory output value generation means and the synthetic error of the synthetic error generation means, and operation management means for managing the operation timing of the second calculation means and effecting the operation of the second calculation means by the timing signal of the operation timing generation means of the first calculation means.

According to the construction described above, extremely high robustness against specific frequency components of torque disturbances applied to the motor can be obtained in the same way as the speed controller of a motor disclosed in JP-A-62-210881 and U.S. Pat. No. 4,755,729 described already. Furthermore, according to the construction described above, the calculation from the detection operation by the speed detection means to the generation of the control signal by the control signal generation means is divided to the first calculation means and to the second calculation means and these first and second calculation means are operated concurrently with each other while keeping a suitable timing. Accordingly, the calculation time can be shortened and the limitations of the calculation time can be further mitigated.

BRIEF DESCRIPTION OF THE DRAWINGS

FIG. 6 is a flowchart showing an example of a program incorporated in a compensator of a second embodiment of the present invention;

DESCRIPTION OF THE PREFERRED EMBODIMENTS

Figure 2:
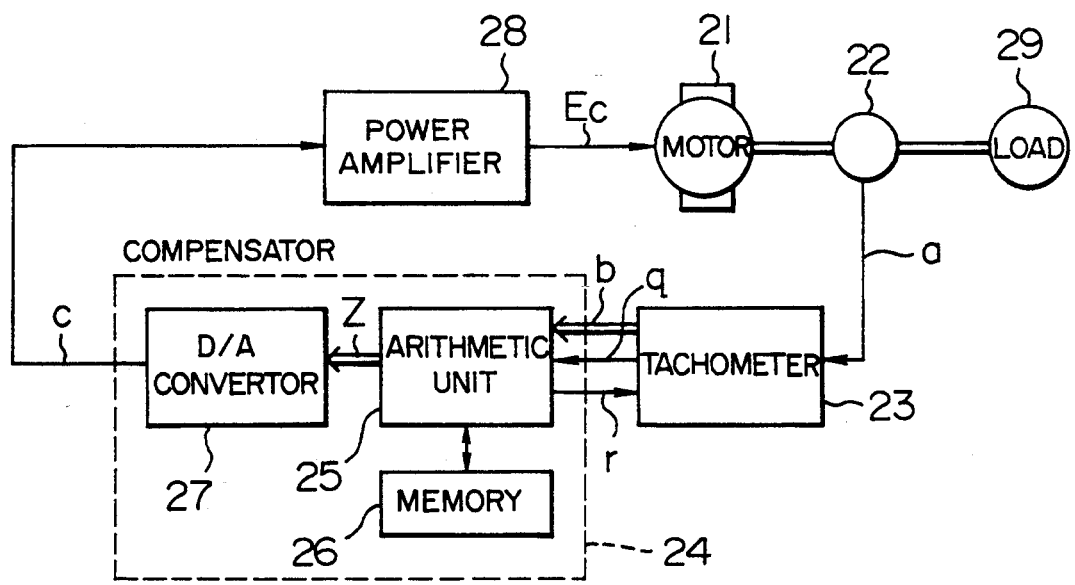
FIG. 2 is a structural view showing the overall structure of a first embodiment of the present invention.

FIG. 2 is a structural view showing the overall structure of the first embodiment of the present invention. In FIG. 2, a D.C. motor 21 directly drives a rotation sensor 22 and a load 29. The rotation sensor 22 generates an A.C. signal a $Zq$ times per round (where $Zq$ is an integer of 2 or more, and is, for example, 406 in the case of a capstan motor of a video tape recorder) with the revolution of the motor 21. The A.C. signal a of the rotation sensor 22 is inputted to a tachometer 23 to give a digital signal b in accordance with the period of the A.C. signal a.

Figure 3:
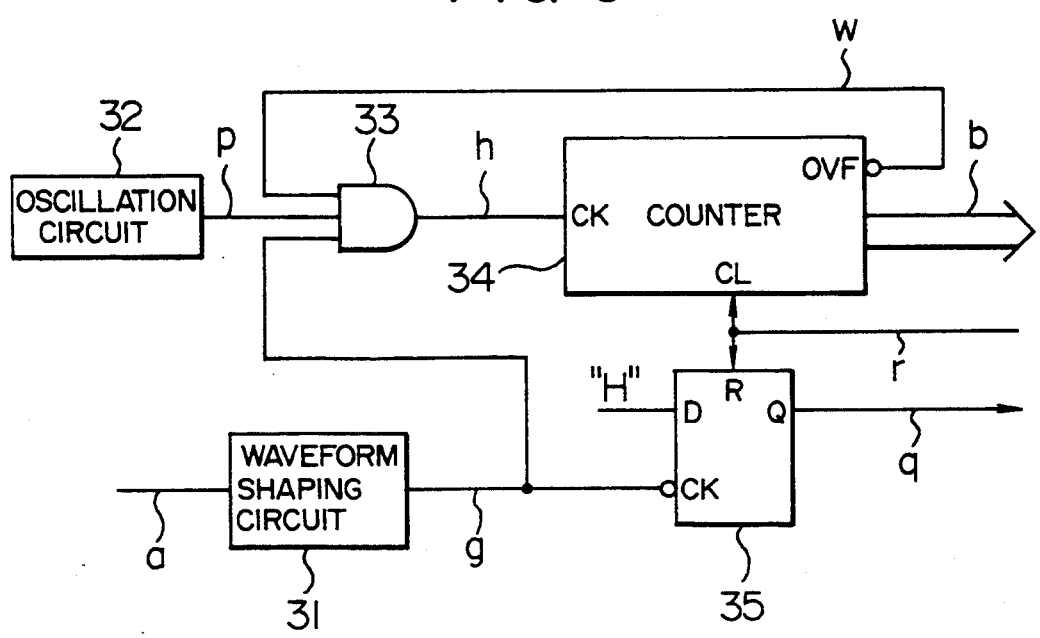
FIG. 3 is a structural view showing a definite structural example of a tachometer shown in FIG. 2.

FIG. 3 shows a definite structural example of the tachometer 23. The A.C. signal a is wave-shaped by a waveform shaping circuit 31 to give a wave-shaped signal g. This signal g is inputted to an AND circuit 33 and to a flip-flop 35. A clock pulse p of an oscillation circuit 32 and an overflow output signal w are also inputted to the input terminal of the AND circuit 33. The oscillation circuit 32 comprises a crystal oscillator, a frequency divider, etc, and generates a clock pulse p (about 8 MHz) which is considerably higher than the frequency of the wave-shaped signal g. The counter 34 is a 16-bit UP counter which counts up its content whenever the output pulse h of the AND circuit 33 is applied thereto. The overflow output signal w remains "H" when the count content of the counter 34 is below a predetermined value, and changes to "L" when the count content exceeds the predetermined value. (Here, the term "H" represents a high potential state and "L" does a low potential state.) The D-type flip-flop 35 fetches "H" inputted to the data input terminal by the use of the fall edge of the wave-shaped signal g as a trigger signal and makes its output q "H" (q="H"). When a reset signal r from the compensator 24 changes to "H", the internal state of each of the counter 34 and the flip-flop 35 is reset.

Next, the operation of the tachometer 23 shown in FIG. 3 will be explained. It will be hereby assumed that both the counter 34 and flip-flop 35 are reset by the reset signal r. When the output signal g of the waveform shaping circuit 31 changes from "L" to "H", the clock pulse p of the oscillation circuit 32 is outputted as the output signal h of the AND circuit 33. The counter 34 counts this output signal h and changes its internal state. When the output signal g of the waveform shaping circuit 31 changes from "H" to "L", the output signal h of the AND circuit 33 becomes "L" and the counter 34 holds its internal state. The flip-flop 35 fetches the data "H" by the fall edge of the signal g and changes its output signal q from "L" to "H". The digital signal b of the counter 34 is proportional to the (half) period length of the A.C. signal a of the rotation sensor 22 and is inversely proportional to the rotating speed of the motor 21. The later-appearing compensator 24 inputs the digital signal b of the counter 34 when the output signal q of the flip-flop 35 becomes "H", then changes the reset signal r to "H" and keeps it "H" for a predetermined short time, resets both the counter 34 and flip-flop 35 to the initial state and thus prepares for the next speed detecting operation. The compensator 24 shown in FIG. 2 includes an arithmetic unit 25 and a memory 26, calculates the digital signal b of the tachometer 23 in accordance with a later-appearing program stored therein, and outputs the control signal c. The control signal c of the compensator 24 is inputted to a power amplifier 28 (driving means), and the power-amplified driving signal Ec (a current proportional to the control signal c) is supplied to the motor 21. Therefore, the motor 21, the rotation sensor 22, the tachometer 23, the compensator 24 and the power amplifier 28 (driving means) together constitute a speed control system, and the rotating speed of the motor 21 is controlled to a predetermined value.

Figure 1:
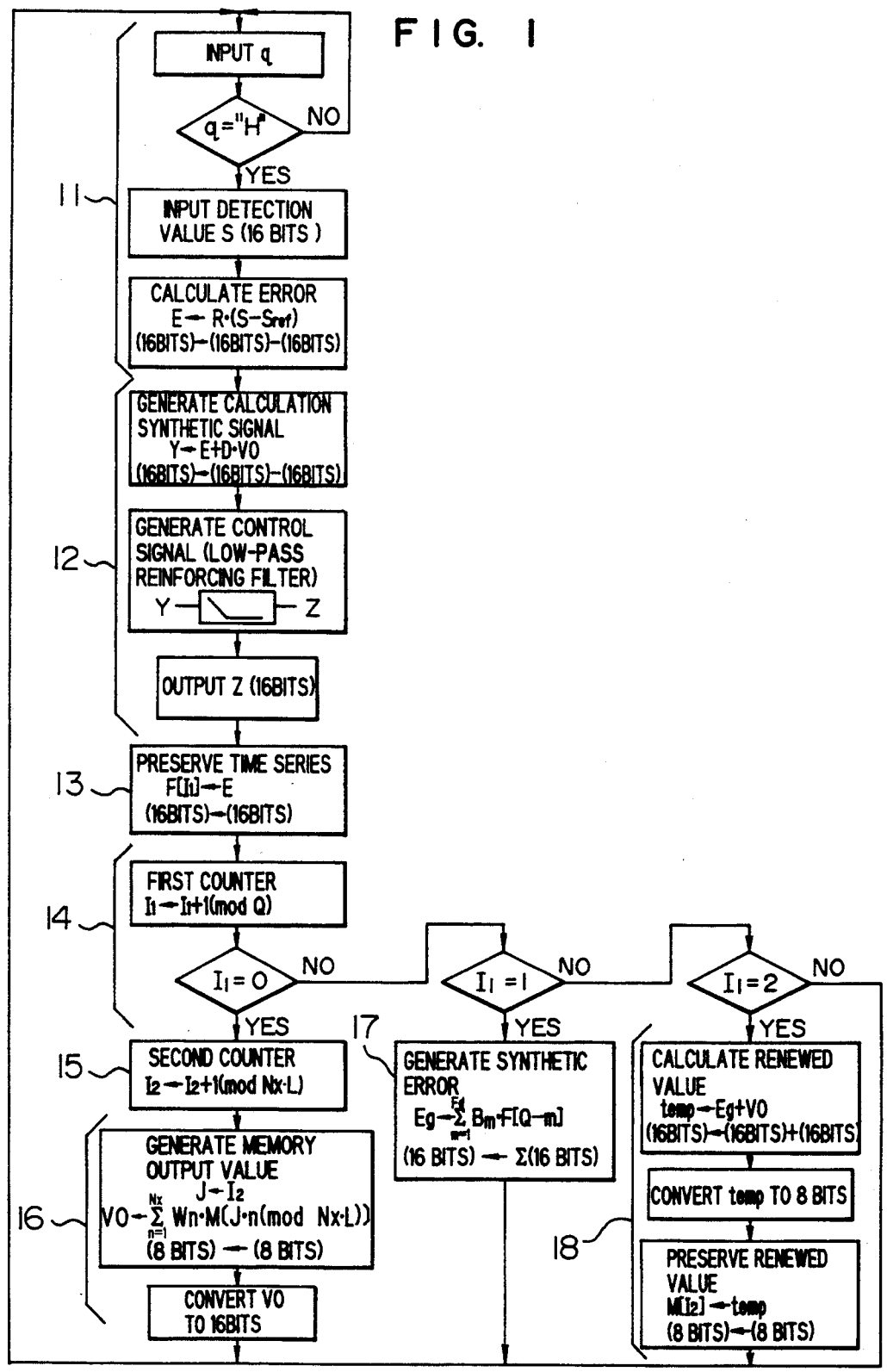
FIG. 1 is a flowchart showing an example of a program incorporated in a compensator shown in FIG. 2.

The memory 26 of the compensator 24 is divided into an ROM (Read-Only Memory) area storing therein a predetermined program and a constant and an RAM (Random Access Memory) area storing temporarily a value, whenever necessary. The arithmetic unit 25 executes predetermined operations and calculations in accordance with the program stored in the ROM area. FIG. 1 shows an example of the program when the arithmetic unit 25 is accomplished by an 8-bit microcomputer capable of both 8-bit operation and 16-bit operation.

(11) Rotation Error Detection Means

To begin with, the arithmetic unit 25 inputs the output signal q of the flip-flop 35 of the tachometer 23 and waits for the change of the signal q to "H". In other words, it monitors that the tachometer 23 detects the (half) period of the A.C. signal a and outputs a new digital signal b. When q changes to "H", the arithmetic unit 25 reads the digital signal b of the tachometer 23, converts it to a speed detection signal S (digital value expressed by 16 bits) corresponding to the digital signal b, changes the reset signal r to "H" for a predetermined time and resets the counter 34 of the tachometer 23 and the flip-flop 35 of the tachometer 23. It subtracts a predetermined reference value Sref (digital value of 16 bits) from the speed detection value S, multiplies the difference thus obtained by R (where R is a predetermined positive real number), and calculates a rotation error E (digital value expressed by 16 bits) of the motor 21 at the present moment ($E = R \cdot (S - Sref)$).

(12) Control Signal Generation Means

Figure 4:
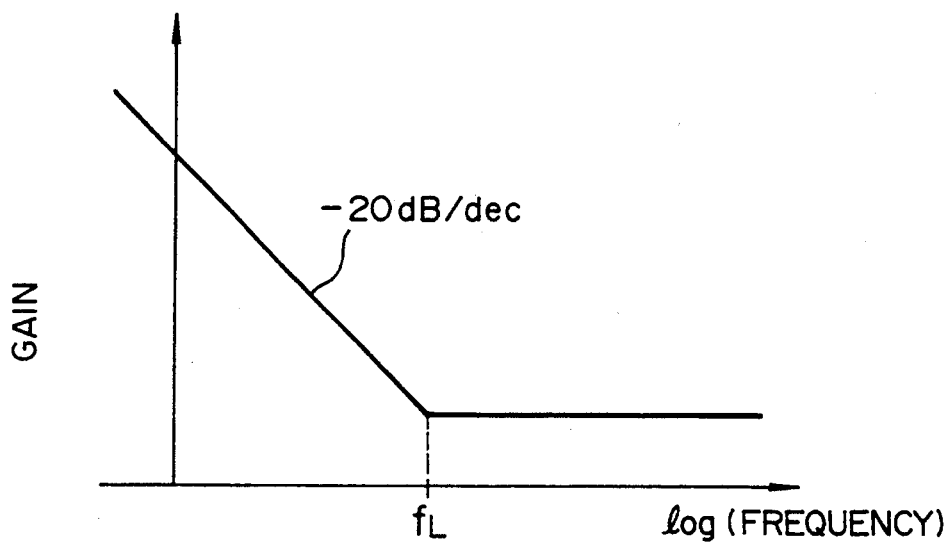
FIG. 4 is a frequency characteristics diagram showing an example of a low-pass reinforcing filter.

A memory output value V0 (digital value expressed by 16 bits) by later-appearing memory output value generation means and the rotation error E (16 bits) at the present moment are calculated and combined at a predetermined ratio D:1 (where D is a constant of $0 < D \leq 1$ and preferably, $D = 0.5$), and calculates a calculation synthetic signal value Y (digital value expressed by 16 bits) ($Y = E + D \cdot V0$). This calculation synthetic signal value Y is inputted to a later-appearing low-pass reinforcing filter and is outputted as a control signal value Z (expressed by 16 bits). The control signal value Z is outputted to a D/A convertor 27 and converted to a D.C.-like voltage c (control signal) which corresponds to the value of the control signal value Z. FIG. 4 shows an example of the frequency characteristics of the low-pass reinforcing filter. Its transmission function is expressed as follows:

$$\frac{1-(1-h)\cdot z^{-1}}{1-z^{-1}}, Z^{-1} = \exp(-TV\cdot s)$$

Tv: sampling period of digital filter, which is hereby a detection period of rotation error detection means h: constant smaller than 1 for determining $f_L$ in FIG. 4.

It is a digital filter, which adds the product of the integrated value of the calculation synthetic signal values Y till the detection timing of the rotation error detection means by h to the calculation synthetic signal value Y, and generates the control signal value Z using the value of the sum of addition as the filter output.

(13) Preservation of Rotation Error Time Series

The rotation error E at the present moment is stored and preserved in the memory value $F[I_1]$ (digital value expressed by 16 bits) corresponding to a later-appearing first count variable $I_1$ ($F[I_1]=E$).

(14) First Count Means

The first count variable $I_1$ is counted up whenever a new speed detection value S is obtained, by the use of Q (which is generally an integer of 2 or more and will be hereby assumed to be an integer of 3 or more) as the mode. In other words, if $I_1=Q$ after $I_1=I_1+1$ ($I_1+1$ is made afresh to be $I_1$), 0 is reset to $I_1$. When such a calculation is made, $I_1$ becomes an integer of from 0 to $Q-1$. By the way, the initial value of $I_1$ is assumed 0. If $I_1$ is 0, the operations of (15) and (16) are executed, if $I_1$ is 1, the operation of (17) is executed and if $I_1$ is 2, the operation of (18) is executed. If $I_1$ is not 0, 1 and 2, the operation returns to the operation of (11).

(15) Second Count Means

The second count variable $I_2$ is counted up whenever the first count variable $I_1$ becomes 0 (or whenever Q new speed detection values S are obtained), by the use of Nx·L (generally, Nx is an integer and L is an integer of 4 or more; here, Nx is an integer of 1 or more and L is an integer which is some multiplies, at least twice, of (Zq/Q)) as a module. In other words, if $I_2=Nx\cdot L$ after the calculation $I_2=I_2+1$ is made, $I_2$ is reset to 0. If such a calculation is made, $I_2$ becomes an integer of from 0 to Nx·L−1. The initial value of $I_2$ is hereby assumed to Nx·L−1.

(16) Memory Output value Generation Means

The integer J is equal to $I_2$ ($J=I_2$), and the memory output value V0 (digital value expressed by 8 bits) is generated using Nx memory value group M [J−nL (mod Nx·L)] (n=1, ..., Nx) spaced apart by intervals L inside the RAM area (digital value expressed by 8 bits) in accordance with the following equation:

$$V0 = \sum_{n=1}^{Nx} Wn \cdot M[J - nL(\text{mod } Nx \cdot L)] \quad (1)$$

Here, the value of the ratio Wn is given as follows:

$$0 < Wn < 2/Nx(n=1,\ldots,Nx) \quad (1)$$

Furthermore, standardization is made as follows:

$$\sum_{n=1}^{Nx} Wn = 1 \quad (3)$$

More definitely, if $$Wn = 1/Nx(n=1,\ldots,Nx) \quad (4)$$

when Nx≦2, the calculation procedure comes to comprise adding merely the memory value group M [J−nL(mod Nx−L)] (n=1, ..., Nx) and then dividing the sum by Nx (integer), and becomes extremely simple.

Then, V0 expressed by 8 bits is converted to 16 bits. Therefore, the operation returns to the operation (11).

(17) Synthesis Error Generation Means

Due to the preservation operation of the rotation error time series described above, Q continuous rotation errors are preserved in F [m] (m=0, 1 ... Q−1) (digital value expressed by 16 bits). The products obtained by multiplying the Fd (where Fd is an integer of from 2 to Q) latest rotation errors among them F [Q−m](m=1, 2 ... Fd) by the predetermined ratio $B_m$ (m=1, 2, ..., Fd) are added and synthesized so as to generate the synthetic error Eg (digital value expressed by 16 bits). In other words, $$Eg = \sum_{m=1}^{Fd} B_m \cdot F[Q - m] \quad (5)$$

where the coefficient Bm has the following relation:

$$B_m = B_{fd-m+1}(m=1, 2, \ldots Fd) \quad (6)$$

Furthermore, standardization is made as follows:

$$\sum_{m=1}^{Fd} B_m = 1 \quad (7)$$

Thereafter, the operation returns to the operation (11).

(18) Renewing and Storing Means

The memory output value V0 by the memory output value generation means (digital value expressed by 16 bits) and the synthetic error Eg (16 bits) are added and synthesized at a ratio of 1:1 to calculate the renewed value. Since the renewed value is expressed by 16 bits in this case, it is converted to 8 bits. The numeric value that cannot be expressed by 8 bits is replaced by a numeric value which is the most approximate to the one that can be expressed by 8 bits. The memory value M[$I_2$] (digital value expressed by 8 bits) inside the RAM area corresponding to the second count variable $I_2$ is renewed by the use of the renewed value thus converted to 8 bits (i.e. M [$I_2$]=Eg+V0], and is stored and preserved till the next renewal. Thereafter, the operation (11) is carried out.

According to the construction described above, extremely high robustness can be obtained against the specific frequency components of the torque disturbances of the load 29 shown in FIG. 2 in the same way as the aforementioned prior patent. Furthermore, if the bit length of the memory value stored in the memory means is made shorter than the bit length of the rotation error of the rotation error detection means or that of the control signal of the control signal generation means as is made in this embodiment (the bit length is reduced from 16 bits to 8 bits in this embodiment), the number of memories necessary for the memory means can be drastically reduced. In other words, even if the number of memories is thus reduced, the extremely robust effect against the specific frequency components of the torque disturbances (the effect of preventing the disturbances of the rotating speed) can be maintained. This can be explained in the following way. Generally, in the speed control of motors, the bit length of the rotation error of the rotation error detection means and the control signal of the control signal generation means illustrated in this embodiment are so set as to correspond to the start, stop and the change of the rotating speed. At the start and stop, however, the rotation error or the control signal assumes a greater value than the value at the time of rotation at a constant speed, so that the necessary bit length becomes longer. On the other hand, it has been found experimentally that the necessary bit length can be reduced to about ½ during the rotation at a constant speed. The high performance speed control function, which makes the memory output value generated by the use of the memory values stored in the memory means valid, is during the rotation at a constant speed. Therefore, even if the bit length of the memory value stored in the memory means is made shorter than the bit length of the rotation error of the rotation error detection means or that of the control signal of the control signal generation means, any adverse influences do not occur on the improvement effect described above. As a result, the number of bits of all the memories can be reduced drastically.

Next, the effect brought forth by inserting the low-pass reinforcing filter will be explained with reference to FIG. 5. It will be hereby assumed also that the arithmetic unit 25 shown in FIG. 2 is accomplished by an 8-bit microcomputer capable of effecting 16-bit operations and 8-bit operations. The low-pass reinforcing filter has frequency characteristics shown in FIG. 4.

First of all, the case where the low-pass reinforcing filter does not exist will be explained. When the motor is rotating at a predetermined rotating speed, the driving signal Ec has a signal intensity in match with the load torque. In the case of the speed controller in which a great load acts by a magnetic tape and a pinch roller as in the case of a capstan motor of a video tape recorder, the driving signal Ec has a great Value. Since high precision control is required, the calculation synthetic signal Y cannot be expressed by 8 bits but needs be expressed by 16 bits in some cases where great torque disturbances occur, for example. In other words, when the load is great, one each memory value to be stored in the memory 26 of the compensator 24 shown in FIG. 2 requires 16 bits (when the low-pass reinforcing filter does not exist). As a result, if the calculation synthetic signal Y is forcedly expressed by 8 bits, the effect described above cannot be obtained and the operation tends to get unstable from time to time. However, it has been found experimentally that though the load torque has extremely great D.C. components, the disturbance component itself can be expressed by 8 bits.

Figure 5A:
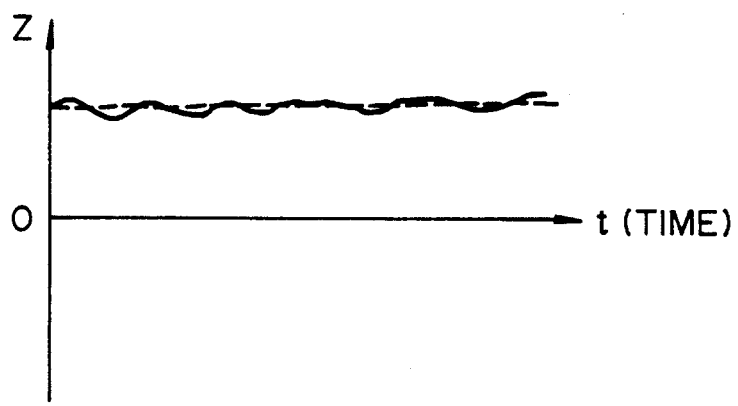
FIGS. 5A, 5B are waveform diagrams of a control signal and an arithmetic synthesis signal shown in FIG. 2.
Figure 5B:
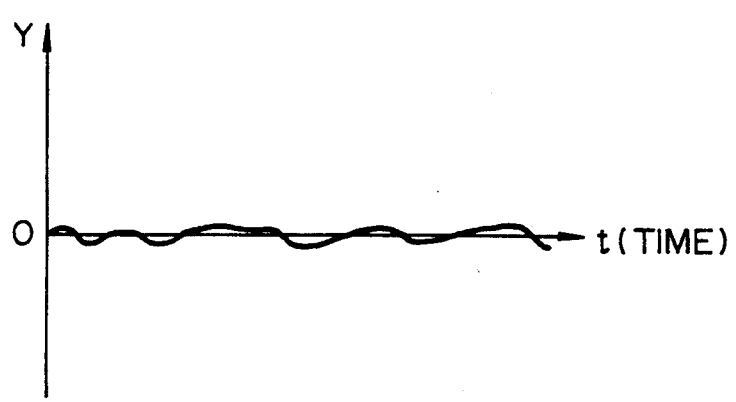

Next, the structure when the low-pass reinforcing filter is inserted will be considered. At this time, the control signal Z takes the value such as shown in FIG. 5A (though the control signal Z is shown analog-wise in the drawing), and the calculation synthetic signal Y becomes a signal having small D.C. component as shown in FIG. 5B. (similarly, this calculation synthetic signal Y is shown analog-wise in the drawing).

In other words, the calculation synthetic signal Y fluctuates near the 0 count, and can be expressed by about 8 bits. This can be explained in the following way. Assuming that the calculation synthetic signal Y contains the D.C. component in the same way as the control signal Z (when it fluctuates with a larger value than the 0 count as the center), the D.C. component of the control signal Z passing through the low-pass reinforcing filter becomes gradually greater with time due to the characteristics of the filter. However, since the control system of the motor consists of a closed loop, the D.C. component of the calculation synthetic signal Y becomes gradually zero and comes to fluctuate near the 0 count. As a result, this signal can be expressed by 8 bits. The fact that the calculation synthetic signal Y in FIG. 2 can be expressed by 8 bits means that the memory necessary for one memory value to be stored in the memory 26 of the compensator 24 shown in FIG. 2 may be only an 8-bit capacity. In other words, the insertion of the low-pass reinforcing filter can prevent any adverse influences on the improving effect described above when D.C.-like torque disturbances occur, even if the bit length of the memory value of the memory means is made shorter than the bit length of the rotation error of the rotation error detection means or that of the control signal of the control signal generation means.

This embodiment deals with the case where the arithmetic unit 25 is accomplished by the 8-bit microcomputer having a simple construction and capable of effecting both the 16-bit operation and 8-bit operation, but the method of accomplishing the arithmetic unit 25 is not particularly limited thereto. The bit length of the memory value of the memory means is not particularly limited to 8 bits, either. The total number of memories can therefore be reduced so long as the bit length of the memory value is shorter than the bit length of the rotation error of the rotation error detection means or that of the control signal of the control signal generation means.

Various methods may be employed as means for accomplishing the low-pass reinforcing filter. Needless to say, the present invention embraces within its scope the arrangement wherein the low-pass reinforcing filter is accomplished by an analog filter, the calculation synthetic signal is inputted to the low-pass reinforcing filter after being subjected to D/A conversion, and its output is used as the control signal of the control signal generation means.

The suppression effect of the torque disturbances of a low frequency can of course be improved by the insertion of the low-pass reinforcing filter when the speed control system of the motor is considered as a whole.

In the embodiment described above, the tachometer detects only the rotating speed of the motor, but the present invention of course embraces within its scope the arrangement wherein the rotating phase of the motor is detected by a known phase detector in addition to the rotating speed, and both of them are synthesized to obtain the rotation error. The output signal of the compensator may be converted to a PWM (Pulse Width Modulation) signal and the output signal of the power amplifier (driving means) may be converted to the PWM signal, as well. A brushless D.C. motor can also be used as the motor. In this way, various changes and modifications can be made without departing from the gist of the present invention.

Next, the speed controller of the motor of the second embodiment of the present invention will be explained about a capstan motor of a video tape recorder, by way of example, with reference to the accompanying drawings.

FIG. 6 shows an example of the program of the compensator 24 when the filter means is a filter the transmission function $H(z^{-1})$ of which is expressed by the following equation:

$$H(z^{-1}) = \frac{1 - z^{-P}}{1 - z^{-1}} \cdot G2 \cdot \sum_{i=0}^{kf-1} z^{-i} \quad (8)$$

The transmission function of this filter can be divided by the transmission function $Ha(z^{-1})$ expressed by the equation given below (containing the transmission function $Ha(z^{-1})$ expressed by equation (9) as its factor):

$$Ha(z^{-1}) = \frac{1 - z^{-P}}{1 - z^{-1}} \quad (9)$$

Figure 7:
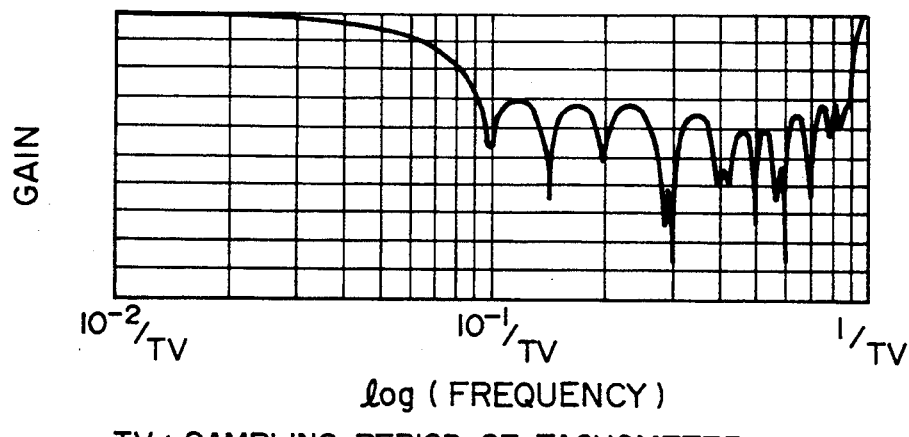
FIG. 7 is a frequency characteristics diagram showing an example of filter means.

FIG. 7 shows an example of the filter frequency characteristics. Here, an example in which the quantity of calculation to be effected within one detection cycle of the tachometer is reduced as much as possible, is shown when the constants P and kf of the filter are different, P and Q are equal and kf>Q. Next, its operation will be explained in detail. (Since the overall structure is the same as that of the first embodiment, its explanation will be omitted.)

(61) Rotation Error Detection Means

The arithmetic unit 25 is under the waiting state till the tachometer 23 inputs the output signal q of the flip-flop 35 and the signal q becomes "H". In other words, the arithmetic unit 25 monitors that the tachometer 23 detects the (half) cycle of the A.C. signal a and outputs the new digital signal b. When the signal q becomes "H", the arithmetic unit 25 reads the digital signal b of the tachometer 23, changes it to the speed detection value S (digital value) corresponding to the digital signal b, raises the reset signal r to "H"for a predetermined time and resets the counter 34 of the tachometer 23 and the flip-flop 35. The arithmetic unit 25 subtracts the predetermined reference value Sref (digital value) from the speed detection value S, multiplies the difference by R (where R is a predetermined positive constant) and calculates the rotation error E of the motor 21 at the present moment (E=R·(S−Sref)).

(62) Control Signal Generation Means

The memory output value V0 by the later-appearing memory output value generation means and the rotation error E at the present moment are calculated and synthesized at a predetermined ratio D:1 (where D is a constant satisfying the relation 0<D≦1 and is preferably D=0.5), and the control signal Z is calculated (Z=E+D−V0). This control signal value Z is outputted to the D/A convertor 27 and converted to a D.C.-like voltage (control signal) c corresponding to the value of the control signal value Z.

(63) First Count Means

The first count variable $I_1$ is counted up whenever a new speed detection value S is obtained, by the use of Q (which is generally an integer of 2 or more, and will be hereby assumed to be an integer of 3 or more for description sake) as a modulo. In other words, after the calculation $I_1 = I_1 + 1$ ($I_1 + 1$ is changed afresh to $I_1$) is made, $I_1$ is reset to 0 if $I_1 = Q$. When such a calculation is made, $I_1$ becomes an integer of from 0 to $Q - 1$. The initial value of $I_1$ is assumed to be 0.

(64) Filter Means 1

Part of calculation for obtaining a calculation error Eg from the rotation error E is made. First of all, the memory value F [$I_1$] corresponding to the first count variable $I_1$ stored till the previous processing is stored in the memory temp1 for filter calculation (temp1=F[$I_1$]). Then, the present rotation error E is stored in F[$I_1$] (F[$I_1$]=E). Furthermore, the difference obtained by subtracting temp1 (in which the rotation error E which is delayed by Q time from the present is stored) from the present rotation error E is stored in the filter calculation memory temp2 (temp2=E−temp1). Next, this temp2 is digitally integrated (EgO=EgO+temp2; EgO+temp2 is made afresh to EgO; the initial value of EgO is 0). The digital value EgO thus obtained is added to addition calculation memories sum1 and sum2 (sum1-=sum1+EgO; sum1+EgO is made afresh to sum1; sum2=sum2+EgO; sum2+EgO is made afresh to sum2).

Here, if the count variable $I_1$ is 0, the operations (65), (66) and (67) are executed and if $I_1$ is 1, the operation (68) is executed. If $I_1$ is 2Q−kf, the operation (69) is executed (where 2Q−kf∫0, 1. If 2Q −kf=0 or 1, the operation (69) may be executed after the operation (67) and the operation (69) may be executed after the operation (68)). If $I_1$ is not 0, 1 and 2Q−kf, the operation returns to the operation (61).

(65) Filter Means 2

The successive calculation to the filter means 1 is carried out to obtain the calculation error Eg. If a memory judgement switch for addition is sw=1, it is set to sw=0 and the calculation error is set to Eg=sum1. If sw=0, sw is set to sw=1 and the calculation error is set to Eg=sum2. Furthermore, gain correction is made by multiplying Eg by a constant G2 (Eg=G2·Eg; G2·Eg is made afresh to Eg).

(66) Second Count Means

The second count variable $I_2$ is counted up whenever the first count variable $I_1$ becomes 0 (or whenever Q new speed detection values S are obtained), using Nx·L (generally, Nx is an integer and L is an integer of 4 or more; here, Nx is an integer of 1 or more and L is an integer which is some multiplies, at least twice, of (Zq/Q)), as a modulo. In other words, if $I_2$ is Nx·L after $I_2$ is made to $I_2 = I_2 + 1$, $I_2$ is set to 0. If such a calculation is made, $I_2$ becomes an integer of from 0 to (Nx·L−1). The initial value of $I_2$ is Nx·L.

(67) Memory Output Value Generation Means

The integer J is equal to $I_2$ (J=$I_2$) and the memory output value V0 is generated from equations (1), (2) and (3) by the use of Nx memory value group M [J−nL (mod Nx·L)] (n=1 . . . Nx) spaced apart by L from one another within the RAM area. Thereafter, the operation returns to the operation (61).

(68) Renewing and Storing Means

The memory output value V0 by the memory output value generation means and the calculation error Eg are calculated and synthesized at the ratio of 1:1 to calculate the renewed value, and the memory value M [$I_2$] inside the RAM area corresponding to the second count variable $I_2$ is renewed (M [$I_2$]=Eg+V0). The renewed value is stored and preserved till the next renewing operation. Thereafter, the operation returns to the operation (61).

(69) Filter Means 3

The memory for addition calculation is cleared. If the memory judgement switch for addition calculation is sw=0, sum1 is set to sum1=0. If sw=1, sum2 is set to sum2=0. Thereafter, the operation returns to the operation (61).

According to the construction described above, high robustness can be obtained against the specific frequency characteristic components of the torque disturbances generated by the load 29 shown in FIG. 2 in the same way as in the patent of the previous application. Moreover, this embodiment can reduce by far drastically the calculation of the compensator 24 than the prior patent. This point will be explained next.

When examining the operation of the filter means in FIG. 6, it can be appreciated that this calculation contains only one multiplication. Generally, multiplication by microcomputers needs extremely longer time than addition and subtraction and microcomputers capable of multiplication within a short time are extremely expensive. Therefore, this function imposes a limitation. Since the operation of the filter must be executed within the cycle for obtaining the new speed detection value S, it should be completed within the short time. In other words, various limitations are imposed on the microcomputer used for the synthetic error generation means of the prior patent because it contains a large number of multiplication operations.

According to the filter means illustrated in this embodiment, however, there are the terms that can be accomplished only by addition and subtraction and the filter can be accomplished by effecting once the multiplication operation for the gain correction. Therefore, the calculation time of the compensator can be drastically reduced, and the limitations imposed on the microcomputer for accomplishing the compensator can be reduced. A great calculation time margin can be obtained if the calculation time of the compensator is reduced, and the motor control becomes possible even if the detection cycle of the tachometer 23 is reduced. If te detection cycle of the tachometer 23 becomes shorter, control performance of the motor against the higher frequency components of the torque disturbances can be improved, and can also be improved against the lower frequency component.

The reduction of the calculation time described above provides an extremely great advantage to control performance of the motor, and when control performance of the motor is improved, the rotation fluctuation of the motor resulting from the torque distrubances can be improved.

Since the limitations imposed on the micro-computer for accomplishing the compensator can be reduced, a high performance speed controller of a motor can be accomplished economically.

In the operations in this embodiment, the operations after the filter means 1 (64) are carried out whenever Q speed detection values are obtained. This filter means has the functions of preventing foldback from a high range to a low range due to sampling and aliasing and securing stability of the control system. The damping quantity of the high frequency component of the rotation error can be reduced. For, two filters the transmission function H($z^{-1}$) of which is expressed by equation (8) are connected in series. The filter means has a greater effect of securing stability of the control system.

The effect of preventing any adverse influences of the torque disturbances of the high frequency band on control performance in the low frequency band due to aliasing becomes extremely great by making the constant P of the filter equal to some multiples of Q.

Since the constants P and kf of the filter are different constants, a large damping quantity can be obtained even at a frequency, at which only a small damping quantity is obtained by the filter whose transmission function H($z^{-1}$) is expressed by equation (8). In other words, a greater damping quantity can be obtained in a broader band. For, a circuit arrangement can be obtained wherein a filter providing the maximum damping quantity at a frequency 1/P times the detection frequency of the tachometer 23 and at the frequencies which are some multiples of the former and a filter providing the maximum damping quantity at a frequency 1/kf times the detection frequency and at frequencies some multiples of the former are connected in series. Though this embodiment illustrates the case where kf>P (=Q), the effect of obtaining a greater damping quantity in a broader band remains unchanged even when kf<P.

A greater damping quantity can be obtained in a broader band when P and kf are different constants and moreover, P and Q are equal to each other. Moreover, it is possible to constitute a filter providing the greatest effect of preventing aliasing due to sampling.

When the calculation made by the filter means is divided into the portion which is carried out whenever the tachometer obtains a new speed detection value S and the portion which is carried out whenever Q speed detection values S are obtained and processing is thus executed as represented by the program of this embodiment, the calculation quantity that is carried out within one cycle of the tachometer becomes extremely small. Since this filter contains only one multiplication, the calculation time can be reduced. Consequently, the margin for the calculation time can be obtained and this is extremely advantages for control performance of the motor.

The effect described above can be maintained so long as the transmission function of the filter means, i.e. H($z^{-1}$), can be divided by the transmission function of equation (9) or by the transmission function Ha($z^{-1}$) expressed by equation (10) below, besides the transmission function described above:

$$Ha(z^{-1}) = \frac{1-z^{-P}}{1-z^{-1}} \sum_{i=0}^{kf-1} z^{-i} \tag{10}$$

The program for accomplishing the filter means is not limited to the one described above, and various other programs can of course be employed.

It can be estimated from the patent of the prior application that when the utilization timing of the memory value of the memory output value generation means in the control signal generation means is faster by $(Q+P)/2$ times than the utilization timing in the renewing and storing means in terms of the number of times of detections by the speed detection means provided that the transmission function $H(z^{-1})$ of the filter means can be divided by the transmission function $Ha(z^{-1})$ of equation (9), the operation of the control system becomes stable as a whole. Similarly, the operation of the control system becomes stable as a whole when the former is faster by $(Q+P+Kf)/2$ than the latter when the transmission function $H(z^{-1})$ of the filter means can be divided by the transmission function $Ha(z^{-1})$ expressed by equation (10). In other words, the phase delay by the filter means and the phase delay in the hold element for sampling are compensated for by deviating the timing as described above. Here, the hold element is included in the control signal generation means.

Though the rotation error E is filtered by the filter of the filter means in this embodiment, the control system can be stabilized also by filtering the memory output value V0. The same effect can also be obtained by filtering both of the rotation error E and the memory output value V0. These changes can be made easily in the light of this embodiment and is of course embraced within the scope of the present invention.

In the embodiments described above, only the rotating speed of the motor is detected by the tachometer, but the rotating phase of the motor may be detected by a known phase detector and both the rotating speed and phase may be synthesized and used as the rotation error. Such means is of course embraced within the scope of the present invention. The output of the compensator may be converted to a digital signal or a PWM (Pulse Width Modulation) signal and the output signal of the power amplifier may be converted to the PWM signal. A brushless D.C. motor may be used as the motor, and various other changes and modifications can be made without changing the gist of the present invention.

Hereinafter, the speed controller of the motor of the third embodiment of the present invention will be explained about the case of a capstan motor of a video tape recorder, by way of example, with reference to the drawings.

Figure 9:
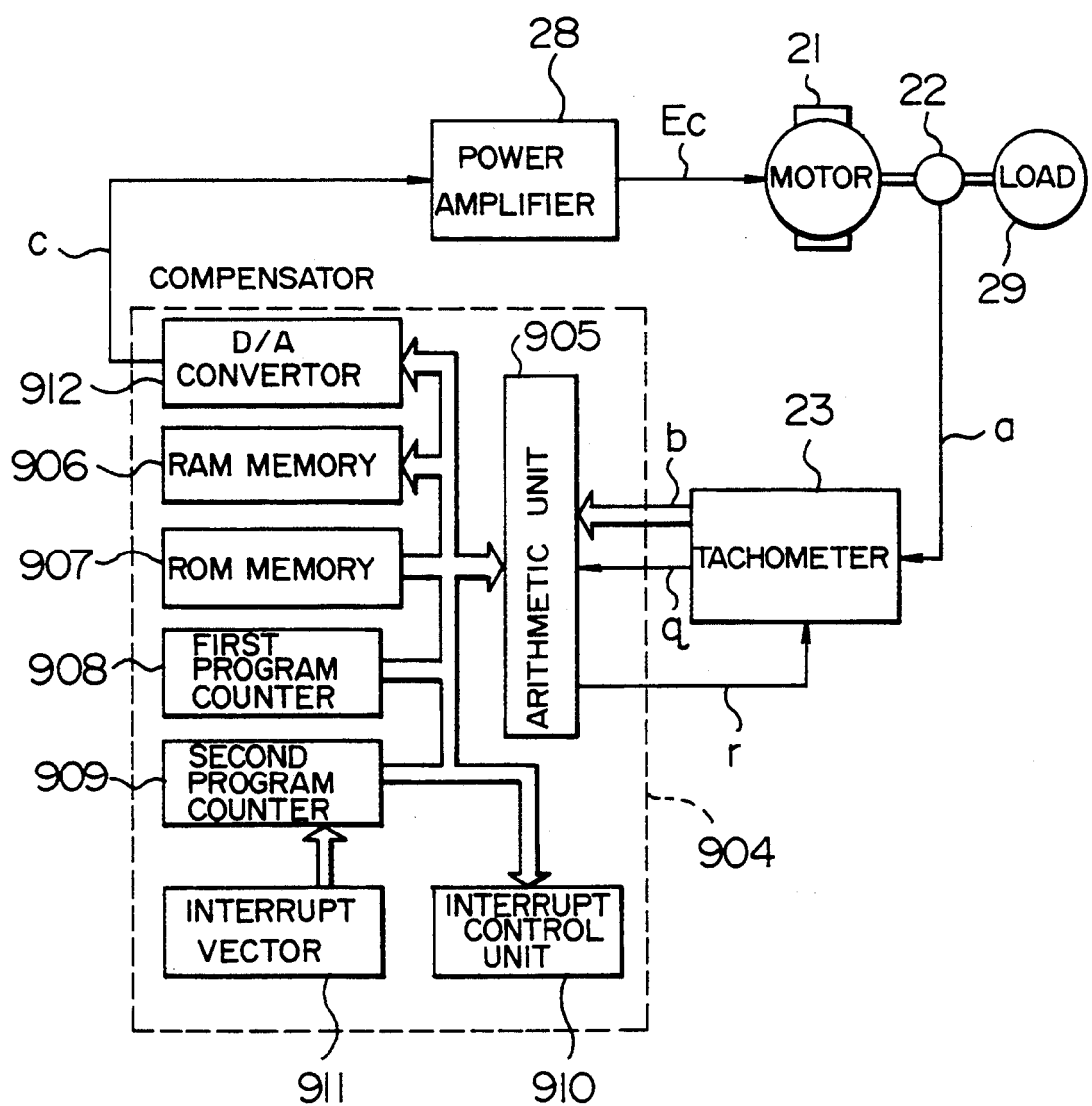
FIG. 9 is a structural view showing the overall structure of a third embodiment of the present invention.

FIG. 9 is a structural view showing the third embodiment of the present invention. In FIG. 9, the D.C. motor 21 directly drives the rotation sensor 22 and the load 29. The rotation sensor 22 generates A.C. signals a Zq times (where Zq is an integer of 4 or more and is hereby assumed to be 406) per round with the revolution of the motor 21. The A.C. signal a of the rotation sensor 22 is inputted to the tachometer 23 to obtain a digital signal b in accordance with the period of the A.C. signal a.

Since the definite structure of the tachometer 23 is the same as that of the afore-mentioned embodiments, its explanation will be omitted.

The compensator 904 shown in FIG. 9 comprises the arithmetic unit 905, the RAM (Random Access Memory) memory 906 for storing a necessary value, whenever necessary, the ROM memory (Read Only Memory) 907 for storing a plurality of predetermined programs and constants, the first program counter 908 for designating the execution address of a predetermined program stored in the ROM memory 907, the second program counter 909, the interrupt vector 911 for storing the leading address of the predetermined interrupt program, the interrupt control unit 910 for changing the content of the second program counter to the address of the interrupt vector 911 by the instruction inside the program, and the D/A convertor 912.

The arithmetic unit 905 carries out alternately the predetermined operations and calculations in accordance with the instruction of the addresses inside the ROM memory 907 designated by the first program counter 908 and the predetermined operations and calculations in accordance with the instructions of the addresses inside the ROM memory 907 designated by the second program counter 909. The contents of the first and second program counters 908, 909 are updated when the instruction are executed, so as to designate the address of the next instruction. When such operations are repeated, two programs can be executed substantially concurrently.

The interrupt control unit 910 changes the content of the second program counter 909 to the address of the interrupt vector 911 in accordance with the interrupt request instruction inside the program, and the predetermined interrupt program is started. Furthermore, when the predetermined interrupt program is processed, the content of the second program counter 909 returns to the value before the execution of the predetermined interrupt program. Accordingly, when this program content returns from the interrupt program, the program executed by the second program counter 909 is the one that was executed before the execution of the interrupt request instruction, and the execution of this program is started once again. In conjunction with the program that is executed by the second program counter 909, a program such as a system control is executed when the interrupt program is not executed. Furthermore, when the interrupt program is not executed, the calculation quantity of the programs executed by the second program counter 909 is hereby assumed to be by far smaller than the control program of the capstan motor.

The digital signal b of the tachometer 23 is calculated in a later-appearing program and the control signal c is outputted. The control signal c of the compensator 904 is inputted to the power amplifier 28 and the power-amplified driving signal EC (the current proportional to the control signal c) is supplied to the motor 21. Accordingly, the speed control system is constituted by the motor 21, the rotation sensor 22 (rotation sensor means), the tachometer 23 (speed detection means), the compensator 904 (compensation means) and the power amplifier 28 (driving means), and the rotating speed of the motor 21 is controlled to a predetermined value.

Figure 8A:
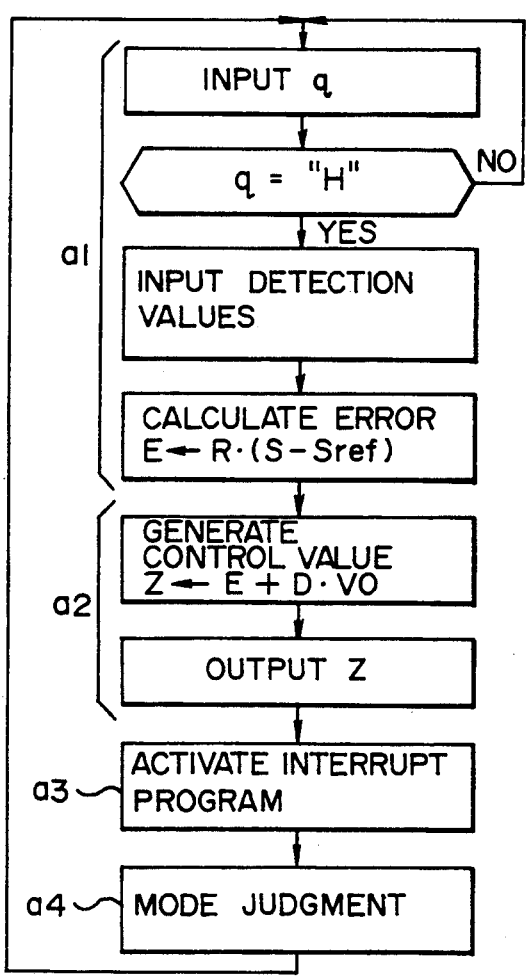
FIGS. 8A and 8B are flowcharts showing an example of a program incorporated in a compensator of a third embodiment of the present invention.
Figure 8B:
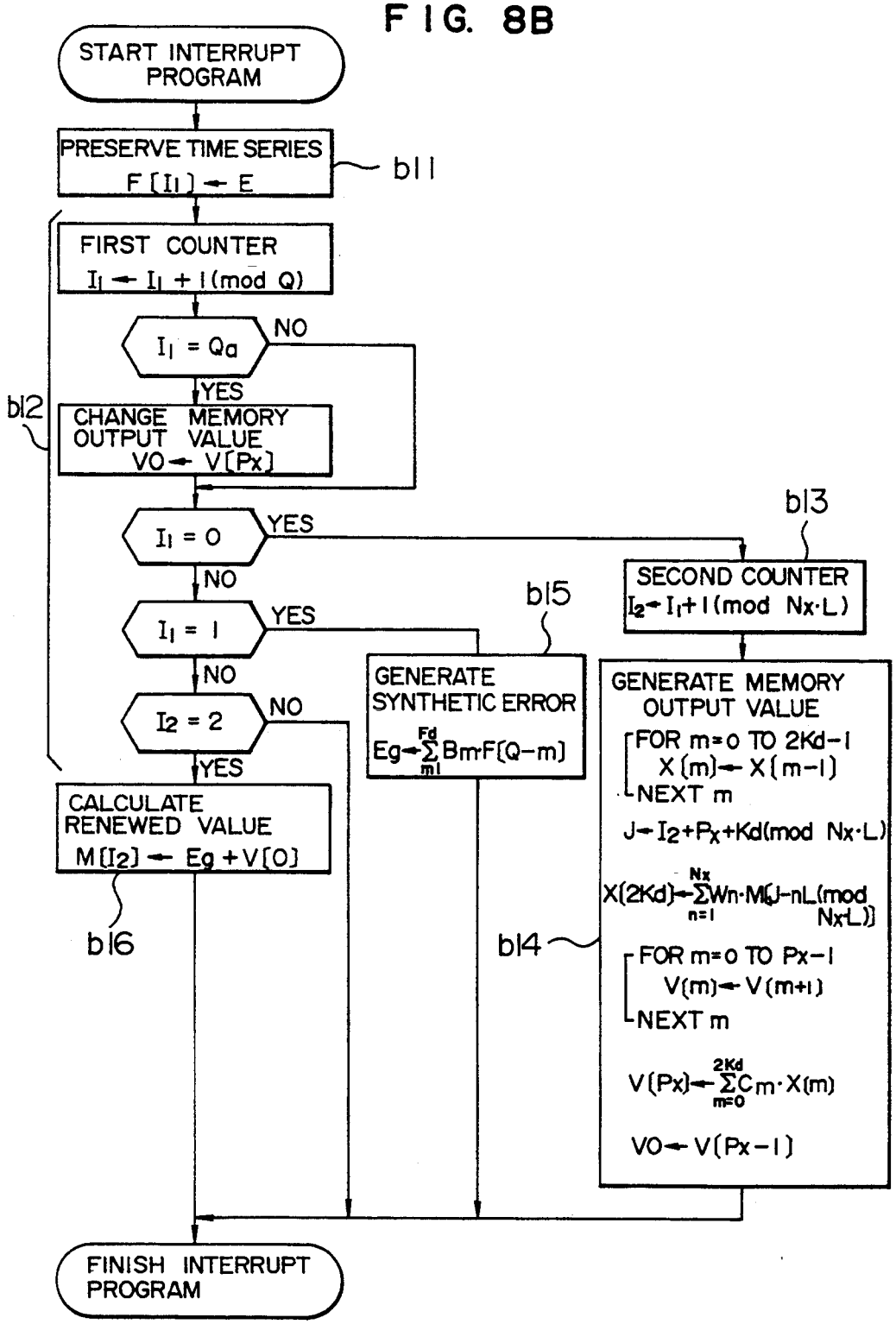

FIG. 8A shows a definite example of the first program executed by the first program counter 908. FIG. 8B shows a definite example of the interrupt program.

Next, the first program shown in FIG. 8A will be explained in detail.

(a1) Rotation Error Detection Means

First of all, the arithmetic unit 905 is under the waiting state till the tachometer 23 inputs the output signal q of the flip-flop 35 and the output signal q becomes "H". In other words, the arithmetic unit 905 monitors if the tachometer 23 detects the (half) cycle of the A.C. signal a and outputs the new digital signal b. When the output signal q becomes "H", it reads the digital signal b of the tachometer 23, changes this digital signal b to the speed detection signal S (digital value) corresponding to the former, changes the reset signal r to "H" for a predetermined time of the tachometer 23 and resets the counter 34 and flip-flop 35. The arithmetic unit 905 further subtracts a predetermined reference value Sref from the speed detection value S and multiplies the difference by R (where R is a predetermined positive constant), to calculate the rotation error E of the motor 21 at the present moment [E=R·(S−Sref)].

(a2) Control Signal Generation Means

The memory output value V0 of the later-appearing memory output value generation means and the rotation error E at the present time is calculated and synthesized at a predetermined ratio D:1 (where D is a constant of $0<D\leq 1$ and preferably, D=0.5), and the control signal Z is calculated (Z=E+D·V0). The control signal value Z is outputted to the D/A convertor 912 and is converted to a voltage (control signal) c corresponding to the control signal value Z.

(a3) Operation Timing Generation Means

First of all, an interrupt request is generated for the interrupt control unit 910 of the compensator 904. The interrupt control unit 910 (operation management means) changes the content of the second program counter 909 to the address of the interrupt vector 911 to which the leading address of the later-appearing interrupt program is set, and the interrupt program is activated.

(a4) Mode Judgement Means

The rotating speed, rotating direction, etc, of the capstan motor are set. When the change of the rotating speed is requested, the predetermined reference value Sref is changed to a desired value.

Thereafter, the operation returns to the operation of the rotation error detection means.

Next, the interrupt program shown in FIG. 8B will be explained in detail.

(b11) Preservation of Rotation Error Time Sequence

The rotation error E at the present moment is stored and preserved in the memory value F [I$_1$] corresponding to the later-appearing first counter variable I$_1$ (F[I$_1$]=E).

(b12) First Count Means

The first count variable I$_1$ is counted up whenever a new speed detection value S is obtained, using Q as a modulo. When I$_1$ becomes equal to Qa (where Qa is an integer smaller than Q), the memory output value V0 is changed to the later-appearing V [Px] and this changing operation is not effected when I$_1$ is not equal to Qa. Accordingly, V0=V[Px−1] (which will be later described) within the range of I$_1$<Qa, and within the range of I$_1 \geq$ Qa, V0=V[Px]. Furthermore, if I$_1$ is 0, the operations (b13), (b14) are executed, and if I$_1$ is 1, the operation (b15) is executed. If I$_1$ is 2, the operation (b16) is executed and if I$_1$ is not 0, 1 and 2, the interrupt program is completed.

(b13) Second Count Means

The second count variable I$_1$ is counted up whenever the first count variable I$_1$ is 0 (or whenever Q new speed detection values S are obtained), using Nx·L as a modulo.

(b14) Memory Output Value Generation Means

After the content of the register variable X[m+1] is sequentially transferred to X[m] (where m=0, 1, 2, ... , 2Kd−1), an integer J as the sum obtained by adding Px+Kd (where Px is an integer of from 1 to 3 and Kd is an integer of 1 or more) to the second count variable I$_2$ using Nx·L as a modulo (that is, [J=I$_2$+Px+Kd(mod Nx·L)] is calculated). The calculated value obtained from the following equation using the memory value group M [J−nL(mod Nx·L)] in the RAM memory 906 is put into X [2Kd]:

$$X[2Kd] = \sum_{n=1}^{N_x} Wn \cdot M[J - n \cdot L \,(\text{mod}\, N_x \cdot L)] \quad (11)$$

Here, the value Wn satisfies equations (2), (3) and (4). In other words, 2Kd+1 calculated values (the calculated values obtained from Nx memory values spaced by the interval L) continuing from X [2Kd] to X [0] are obtained. Next, after the content of the register variable V [m+1] is sequentially transferred to V [m] (m=0, 1, ... , Px−1), the products obtained by multiplying X [m] by a predetermined ratio Cm (m=0, 1, ... , 2Kd) are added and synthesized to obtain the latest memory output value, and this value is put into V [Px].

$$V[Px] = \sum_{m=0}^{2Kd} C_m \cdot X[m] \quad (12)$$

Here, the ratio Cm has the following relation:

$$C_m = C_{2Kd-m} \,(m=0, 1, 2, \ldots, Kd) \quad (13)$$

$$\sum_{m=0}^{2Kd} C_m = 1 \quad (14)$$

In other words, Px+1 memory output values continuing from V [Px] to V [0] are obtained. In this case, if the integer J in equation (12) is set to J$_1$ substantially when V [Px] is calculated, and if the integer J in equation (12) is set to J$_2$ substantially when V [0] is calculated, there is the relation J$_1$=J$_2$ +Px. In other words, a deviation corresponding to the integer Px exists between V [Px] and V [0]. Next, the memory output value V0 utilized in the control signal generation means is set to V [Px−1] (that is, V0=V [Px−1]). Thereafter, this interrupt program is completed.

(b15) Synthetic Error Generation Means

Due to the preservation operation of the rotation error time series described above, Q continuous rotation errors are preserved in F [m] (m=0, 1, ... , Q−1). Among them, Fd latest rotation errors F [Q−m] (m=1, 2 ... , Fd) are multiplied by a predetermined ratio B$_m$ (m=1, 2, ... , Fd), respectively, and these products are added and synthesized to obtain the synthetic error Eg. In other words, the Synthetic error Eg is generated by equations (5), (6) and (7). Thereafter, this interrupt program is completed.

(b16) Renewing and Storing Means

The old memory output value V [0] generated by the memory output value generation means and the synthetic error Eg are calculated and synthesized at the ratio of 1:1 to calculate the renewed value, and the memory value M [I$_2$] in the RAM memory 906 corresponding to the second count variable I$_2$ is renewed (M [I$_2$]=Eg+V[0]) and stored and preserved till the next renewal. Therefore, this interrupt program is completed.

In other words, the first calculation (the first calculation means) accomplished by the RAM memory 906 (the memory means), the memory output means, the synthetic error generation means, the renewing means and the interrupt control unit 910 (the operation control means) and the second calculation (the second calculation means) accomplished by the rotation error detection means, the control signal generation means and the operation timing generation means are executed concurrently with each other inside the compensator 904 while keeping a timing match between them.

According to the construction described above, extremely high robustness against the specific frequency of the torque disturbances occurring in the load 29 shown in FIG. 9 can be obtained in the same way as in the patent of the prior application. Furthermore, this embodiment can provide a large margin for the calculation time. This point will be explained next.

First of all, the operations in the program executed by the first program counter 908 are only those of the rotation error detection means, the control signal generation means, the operation timing generation means and the mode judgement means, so that the calculation quantity becomes extremely small and the large margin can be provided to the calculation time.

Generally, the second program counter 909 executes the program such as the system control. The interrupt program is executed in the form in which the interrupt program interrupts this system control program, or the like. However, since no processing having high emergency exists in the calculation operation of the system control, or the like, there are substantially no influences on the system control, or the like even if the operations of the rotation error preservation means, the first count means, the second count means, the memory output value generation means, the synthetic error output generation means and the renewing means are executed by the interrupt program. Since the operations of the first and second program counters 908 and 909 are carried out concurrently, the operation of the interrupt program by the second program counter 909 need not be completed by the timing of the next rotation error detection means, but may be completed before the timing of the next control signal generation means. In this way, an extremely great margin of the calculation time can be secured in the program executed by the second program counter 909, too.

As described above, since the great calculation margin can be obtained for the operation executed by each of the first and second program counters 908 and 909, the motor control becomes possible even when the detection cycle by the tachometer 23 is reduced. If the detection cycle of the tachometer 23 becomes short, control performance against the high frequency components of the torque disturbances can be improved, and can also be improved drastically against the low frequency component, as well.

Such a great margin for the calculation time is an extremely great advantage to control performance of the motor. Since control performance of the motor can thus be improved, the fluctuation of the motor due to the torque disturbances can be improved to a low level.

When this embodiment is adapted practically to the capstan motor of a video tape recorder, a processing such as a low-pass reinforcing filter, control stability judgement, etc, becomes necessary as a new processing for the first program counter, and the operations inclusive of these processing can be accomplished when the margin of the calculation time exists for the second program counter 909 as described above.

In the embodiment described above, the arithmetic unit 905 (the calculation execution means), the ROM memory 907 (the instruction memory means) and the RAM memory 906 (the digital value memory means) are shared substantially in common by the first and second operations. This arrangement provides not only the advantage that the production cost can be drastically reduced but also the advantage that the operation becomes extremely simple and fast because the exchange of the digital values between the first and second calculations can be made by the use of the common RAM memory.

The concurrent processings can be made at substantially the same timing as that of the embodiment described above by preparing the program so that the interrupt request instruction is not used in the first program but the state of the specific variable is changed at the timing of the execution of the interrupt request instruction, and the change of that specific variable is detected in the program executed by the second program counter 909. Such an arrangement is not much practical because some limitations occur in the program executed by the second program counter 909. However, when the calculation quantity of the program executed by the second program counter 909 is extremely small at the point when the interrupt program is not executed, the interrupt control unit 910 becomes unnecessary and hence, this method becomes extremely effective.

If the calculation for obtaining the weighted mean is inserted into the memory output value generation means or if a predetermined deviation (V [Px] is ahead of V [0]) is disposed between the first memory output value V0 (V[Px]) of the memory output value generation means used in the control signal generation means and the second memory output value V[0] of the memory output value generation means used in the renewing and storing means, it has been confirmed that excellent control characteristics can be obtained within the control range and the operation of the control system becomes stable as a whole.

In this embodiment, the operation timings of the memory output value generation means, synthetic error generation means and renewing and storing means are deviated from one another in connection with the detection operation of the tachometer 23. In this way, the calculation quantity necessary within one detection cycle of the tachometer 23 can be drastically reduced and a microcomputer having a low operation speed can be used for the compensator 904. Particularly when the operations of the memory output value generation means, synthetic error generation means and renewing and storing means contain a great deal of transfer and multiplication as in the present embodiment, the calculation quantity required within one detection cycle of the tachometer 23 can be reduced.

Furthermore, when the calculation quantity of the interrupt program executed by the second program counter becomes smaller, the calculation time that can be used for programs other than the interrupt program becomes greater. Accordingly, the limitations imposed on the program become extremely small when other motor controls or system controls are carried out.

The calculation using the ratio $W_n$ or $C_m$ is not particularly limited to the calculation described above and any can be used so long as they can accomplish the program content described above. Therefore, various equivalent modifications of formulas can of course be made.

In each of the embodiments described above, only the rotating speed of the motor is detected by the tachometer. Needless to say, however, the present invention embraces within its scope such a case where the rotating phase of the motor is detected by a known phase detector besides the rotating speed, and they are synthesized to provide the rotation error. The output of the compensator may be converted to the digital signal or to the PWM (Pulse Width Modulation) signal, and the output signal of the power amplifier may be converted to the PWM signal. Furthermore, a brushless D.C. motor may be used as the motor. The compensator may be constituted completely by hardwares and may be allowed to carry out the same operations as those by the programs. Various other changes and modifications could be made by those skilled in the art without departing from the spirit of the present invention.

We claim:

1. A speed controller of a motor comprising:
   rotation sensor means for generating an A.C. signal having a period in accordance with a rotating speed of a motor;
   speed detection means for effecting detection of the rotating speed of said motor a plurality of times per each revolution of said motor by using the A.C. signal of said rotation sensor means;
   compensation means for generating a control signal on the basis of a detection signal of said speed detection means; and
   driving means for driving said motor in accordance with the control signal of said compensation means; wherein said compensation means includes:
   rotation error detection means for obtaining a rotation error responsive to the detection signal of said speed detection means;
   memory means for storing, four or more memory values having a bit length shorter than that of said rotation error of said rotation error detection means or that of the control signal of said control signal generation means;
   memory output value generation means for generating a memory output value by the use of at least one memory value stored in said memory means;
   synthetic error generation means for generating a synthetic error by synthesizing a plurality of said rotation errors of said rotation error detection means;
   renewing and storing means for renewing and storing substantially sequentially the memory value of said memory means by a renewed value corresponding to the value obtained by calculating and synthesizing the memory output value of said memory output value generation means and the synthetic error of said synthetic error generation means whenever said speed detection means effects the detection operation Q times (where Q is an integer of 2 or more); and
   control signal generation means for generating said control signal responsive to the memory output value of said memory output value generation means and to the rotation error of said rotation error detection means.

2. A speed controller of a motor according to claim 1, wherein said renewing and storing means further includes renewed value correction means for generating a renewed value by reducing the bit length of the value obtained by calculating and synthesizing the memory output value of said memory output value generation means and the synthetic error of said synthetic error generation means, and said memory output value generation means includes memory output value correction means for making the bit length of said memory output value equal to the bit length of the rotation error.

3. A speed controller of a motor according to claim 2, wherein said renewed value correction means makes the value of the renewed value zero when the absolute value of the value obtained by calculating and synthesizing the memory output value of said memory output value generation means and the synthetic error of said synthetic error generation means is greater than a predetermined value.

4. A speed controller of a motor according to claim 3, wherein said control signal generation means includes low-pass reinforcing filter means for reinforcing low frequency components of said control signal.

5. A speed controller of a motor according to claim 3, wherein said driving means includes low-pass reinforcing filter means for reinforcing low frequency components of said control signal.

6. A speed controller of a motor according to claim 2, wherein said renewed value correction means changes the value of said renewed value to a value corresponding to a predetermined value when the absolute value obtained by calculating and synthesizing the memory output value of said memory output value generation means and the synthetic error of said synthetic error generation means is greater than a predetermined value.

7. A speed controller of a motor according to claim 6, wherein said control signal generation means includes low-pass reinforcing filter means for reinforcing low frequency components of said control signal.

8. A speed controller of a motor according to claim 6, wherein said driving means includes low-pass reinforcing filter means for reinforcing low frequency components of said control signal.

9. A speed controller of a motor according to claim 1, wherein said renewing and storing means includes renewed value correction means for generating a renewed value by reducing the bit length of the value obtained by calculating and synthesizing the memory output value of said memory output value generation means and the synthetic error of said synthetic error generation means, and said control signal generation means includes memory output value correction means for making the bit length of the memory output value equal to the bit length of the rotation error.

10. A speed controller of a motor according to claim 9, wherein said renewed value correction means makes the value of the renewed value zero when the absolute value of the value obtained by calculating and synthesizing the memory output value of said memory output value generation means and the synthetic error of said synthetic error generation means is greater than a predetermined value.

11. A speed controller of a motor according to claim 10, wherein said control signal generation means includes low-pass reinforcing filter means for reinforcing low frequency components of said control signal.

12. A speed controller of a motor according to claim 10, wherein said driving means includes low-pass reinforcing filter means for reinforcing low frequency components of said control signal.

13. A speed controller of a motor according to claim 9, wherein said renewed value correction means changes the value of said renewed value to a value corresponding to a predetermined value when the absolute value obtained by calculating and synthesizing the memory output value of said memory output value generation means and the synthetic error of said synthetic error generation means is greater than a predetermined value.

14. A speed controller of a motor according to claim 13, wherein said control signal generation means includes low-pass reinforcing filter means for reinforcing low frequency components of said control signal.

15. A speed controller of a motor according to claim 13, wherein said driving means includes low-pass reinforcing filter means for reinforcing low frequency components of said control signal.

16. A speed controller of a motor according to claim 1, wherein said synthetic error generation means includes synthetic error correction means for generating a new synthetic error having a reduced bit length from said synthetic error, and said memory output value generation means includes memory output value correction means for making the bit length of said memory output value equal to the bit length of the rotation error.

17. A speed controller of a motor according to claim 16, wherein said synthetic error correction means makes the value of said new synthetic error zero when the absolute value of said synthetic error is greater than a predetermined value.

18. A speed controller of a motor according to claim 17, wherein said control signal generation means includes low-pass reinforcing filter means for reinforcing low frequency components of said control signal.

19. A speed controller of a motor according to claim 17, wherein said driving means includes low-pass reinforcing filter means for reinforcing low frequency components of said control signal.

20. A speed controller of a motor according to claim 16, wherein said synthetic error correction means changes the value of said new synthetic error to a value corresponding to a predetermined value when the absolute value of said synthetic error is greater than a predetermined value.

21. A speed controller of a motor according to claim 20, wherein said control signal generation means includes low-pass reinforcing filter means for reinforcing low frequency components of said control signal.

22. A speed controller of a motor according to claim 20, wherein said driving means includes low-pass reinforcing filter means for reinforcing low frequency components of said control signal.

23. A speed controller of a motor according to claim 1, wherein said synthetic error generation means includes synthetic error correction means for generating a new synthetic error having a reduced bit length from said synthetic error, and said control signal generation means includes memory output value correction means for making the bit length of said memory value equal to the bit length of the rotation error.

24. A speed controller of a motor according to claim 23, wherein said synthetic error correction means makes the value of said new synthetic error zero when the absolute value of said synthetic error is greater than a predetermined value.

25. A speed controller of a motor according to claim 24, wherein said control signal generation means includes low-pass reinforcing filter means for reinforcing low frequency components of said control signal.

26. A speed controller of a motor according to claim 24, wherein said driving means includes low-pass reinforcing filter means for reinforcing low frequency components of said control signal.

27. A speed controller of a motor according to claim 23, wherein said synthetic error correction means changes the value of said new synthetic error to a value corresponding to a predetermined value when the absolute value of said synthetic error is greater than the predetermined value.

28. A speed controller of a motor according to claim 27, wherein said control signal generation means includes low-pass reinforcing filter means for reinforcing low frequency components of said control signal.

29. A speed controller of a motor according to claim 27, wherein said driving means includes low-pass reinforcing filter means for reinforcing low frequency components of said control signal.

30. A speed controller of a motor comprising:
rotation sensor means for generating an A.C. signal having a period in accordance with a rotating speed of a motor;
speed detection means for effecting detection of the rotating speed of said motor a plurality of times per each revolution of said motor by using the A.C. signal of said rotation sensor means;
compensation means for generating a control signal on the basis of a detection signal of said speed detection means; and
driving means for driving said motor in accordance with the control signal of said compensation means; wherein said compensation means includes:
rotation error detection means for obtaining a rotation error responsive to the detection signal of said speed detection means;
memory means for storing four or more memory values;
memory output value generation means for generating a memory output value by the use of at least one memory value stored in said memory means;
filter means for obtaining a calculation error from the rotation error of said rotation error detection means by the use of a filter the transmission function of which can be divided by a transmission function $Ha(z^{-1})$ expressed by equation below:

$$Ha(z^{-1}) = \frac{1 - z^{-P}}{1 - z^{-1}}$$

[where $z^{-1}$ is a delay of one sample time, and $z^{-P}$ is a delay of P sample time (with the proviso that P is an integer of 2 or more)];
renewing and storing means for renewing and storing substantially sequentially the memory value of said memory means by a renewed value corresponding to the value obtained by calculating and synthesizing the calculation error of said filter means and the memory output value of said memory output value generation means whenever said speed detection means effects the detection operation Q times (where Q is an integer of 2 or more); and
control signal generation means for generating a control signal responsive to the memory output value of said memory output value generation means and to the rotation error of said rotation error detection means.

31. A speed controller of a motor according to claim 30, wherein said control signal generation means includes low-pass reinforcing filter means for reinforcing low frequency components of said control signal.

32. A speed controller of a motor according to claim 30, wherein said driving means includes low-pass reinforcing filter means for reinforcing low frequency components of said control signal.

33. A speed controller of a motor according to claim 30, wherein P is equal to some multiples of Q.

34. A speed controller of a motor according to claim 33, wherein said control signal generation means includes low-pass reinforcing filter means for reinforcing low frequency components of said control signal.

35. A speed controller of a motor according to claim 33, wherein said driving means includes low-pass reinforcing filter means for reinforcing low frequency components of said control signal.

36. A speed controller of a motor comprising:
rotation sensor means for generating an A.C. signal having a period in accordance with a rotating speed of a motor;
speed detection means for effecting detection of the rotating speed of said motor a plurality of times per each revolution of said motor by using the A.C. signal of said rotation sensor means;
compensation means for generating a control signal on the basis of a detection signal of said speed detection means; and
driving means for driving said motor in accordance with the control signal of said compensation means; wherein said compensation means includes:
rotation error detection means for obtaining a rotation error responsive to the detection signal of said speed detection means;
memory means for storing four or more memory values;
memory output value generation means for generating a memory output value by the use of at least one memory value stored in said memory means;
filter means for obtaining a calculation error from the rotation error of said rotation error detection means by the use of a filter the transmission function of which can be use of a filter the transmission function of which can be divided by a transmission function $Ha(z^{-1})$ expressed by equation below:

$$Ha(z^{-1}) = \frac{1 - z^{-P}}{1 - z^{-1}} \sum_{i=0}^{kf-1} z^{-i}$$

[where $z^{-1}$ is a delay of one sample time, $z^{-P}$ is a delay of P sample time (with the proviso that P is an integer of 2 or more), $z^{-i}$ is a delay of i sample time, and kf is a constant of an integer of 2 or more],
renewing and storing means for renewing and storing substantially sequentially the memory value of the memory means by a renewed value corresponding to the value obtained by calculating and synthesizing the calculation error of said filter means and the memory output value of said memory output value generation means whenever said speed detection means effects the detection operation Q times (where Q is an integer of 2 or more); and
control signal generation means for generating a control signal responsive to the memory output value of said memory output value generation means and to the rotation error of said rotation error detection means.

37. A speed controller of a motor according to claim 36, wherein said control signal generation means includes low-pass reinforcing filter means for reinforcing low frequency components of said control signal.

38. A speed controller of a motor according to claim 36, wherein said driving means includes low-pass reinforcing filter means for reinforcing low frequency components of said control signal.

39. A speed controller of a motor according to claim 36, wherein P is equal to some multiples of Q.

40. A speed controller of a motor according to claim 39, wherein said control signal generation means includes low-pass reinforcing filter means for reinforcing low frequency components of said control signal.

41. A speed controller of a motor according to claim 39, wherein said driving means includes low-pass reinforcing filter means for reinforcing low frequency components of said control signal.

42. A speed controller of a motor according to claim 36, wherein P and kf are mutually different constants.

43. A speed controller of a motor according to claim 42, wherein said control signal generation means includes low-pass reinforcing filter means for reinforcing low frequency components of said control signal.

44. A speed controller of a motor according to claim 42, wherein said driving means includes low-pass filter means for reinforcing low frequency components of said control signal.

45. A speed controller of a motor according to claim 42, wherein P and kf are mutually different constants.

46. A speed controller of a motor according to claim 45, wherein said control signal generation means includes low-pass reinforcing filter means for reinforcing low frequency components of said control signal.

47. A speed controller of a motor according to claim 45, wherein said driving means includes low-pass reinforcing filter means for reinforcing low frequency components of said control signal.

48. A speed controller of a motor comprising:
rotation sensor means for generating an A.C. signal having a period in accordance with a rotating speed of a motor;
speed detection means for effecting detection of the rotating speed of said motor a plurality of times per each revolution of said motor by using the A.C. signal of said rotation sensor means;
compensation means for generating a control signal on the basis of a detection signal of said speed detection means; and
driving means for driving said motor in accordance with the control signal of said compensation means;
wherein said compensation means includes;
rotation error detection means for obtaining a rotation error responsive to the detection signal of said speed detection means;
memory means for storing four or more memory values;
memory output value generation means for generating a memory output value by the use of at least one memory value stored in said memory means;
filter means for obtaining a calculation error from the rotation error of said rotation error detection means by the use of a filter the transmission function of which is expressed by equation below:

$$Ha(z^{-1}) = \frac{1-z^{-P}}{1-z^{-1}} \cdot \frac{1}{P}$$

(where $z^{-1}$ is a delay of one sample time, and $z^{-P}$ is a delay of P sample time (with the proviso that P is an integer of 2 or more)];

renewing and storing means for renewing and storing substantially sequentially the memory value of said memory means by a renewed value corresponding to the value obtained by calculating and synthesizing the calculation error of said filter means and the memory output value of said memory output value generation means whenever said speed detection means effects the detection operation Q times (where Q is an integer of 2 or more ); and memory output value generation means and to the rotation error of said rotation error detection means.

49. A speed controller of a motor according to claim 48, wherein said control signal generation means includes low-pass reinforcing filter means for reinforcing low frequency components of said control signal.

50. A speed controller of a motor according to claim 48, wherein said driving means includes low-pass reinforcing filter means for reinforcing low frequency components of said control signal.

51. A speed controller of a motor according to claim 48, wherein P is equal to some multiples of Q.

52. A speed controller of a motor according to claim 51, wherein said control signal generation means includes low-pass reinforcing filter means for reinforcing low frequency components of said control signal.

53. A speed controller of a motor according to claim 51, wherein said driving means includes low-pass reinforcing filter means for reinforcing low frequency components of said control signal.

54. A speed controller of a motor comprising:
rotation sensor means for generating an A.C. signal having a period in accordance with a rotating speed of a motor;
speed detection means for effecting detection of the rotating speed of said motor a plurality of times per each revolution of said motor by using the A.C. signal of said rotation sensor means;
compensation means for generating a control signal on the basis of a detection signal of said speed detection means; and
driving means for driving said motor in accordance with the control signal of said compensation means;
wherein said compensation means includes:
rotation error detection means for obtaining a rotation error responsive to the detection signal of said speed detection means;
memory means for storing four or more memory values;
memory output value generation means for generating a memory output value by the use of at least one memory value stored in said memory means;
filter means for obtaining a calculation error from the rotation error of said rotation error detection means by the use of a filter the transmission function of which is expressed by equation expressed below:

$$Ha(z^{-1}) = \frac{1-z^{-P}}{1-z^{-1}} \sum_{i=0}^{kf-1} z^{-i} \cdot \frac{1}{P \cdot kf}$$

[where $z^{-1}$ is a delay of one sample time, $z^{-P}$ is a delay of P sample time (with the proviso that P is an integer of 2 or more), $z^{-i}$ is a delay of i sample time, and kf is a constant of an integer of 2 or more];

renewing and storing means for renewing and storing substantially sequentially the memory value of said memory means by a renewed value corresponding to the value obtained by calculating and synthesizing the calculation error of said filter means and the memory output value of said memory output value generation means whenever said speed detection means effects the detection operation Q times (where Q is integer of 2 or more); and control signal generation means for generating a control signal responsive to the memory output value of said memory output value generation means and to the rotation error of said rotation error detection means.

55. A speed controller of a motor according to claim 54, wherein said control signal generation means includes low-pass reinforcing filter means for reinforcing low frequency components of said control signal.

56. A speed controller of a motor according to claim 54, wherein said driving means includes low-pass reinforcing filter means for reinforcing low frequency components of said control signal.

57. A speed controller of a motor according to claim 54, wherein P is equal to some multiples to Q.

58. A speed controller of a motor according to claim 57, wherein said control signal generation means includes low-pass reinforcing filter means for reinforcing low frequency components of said control signal.

59. A speed controller of a motor according to claim 57, wherein said driving means includes low-pass reinforcing filter means for reinforcing low frequency components of said control signal.

60. A speed controller of a motor according to claim 54, wherein P and kf are mutually different constants.

61. A speed controller of a motor according to claim 60, wherein said control signal generation means includes low-pass reinforcing filter means for reinforcing low frequency components of said control signal.

62. A speed controller of a motor according to claim 60, wherein said driving means includes low-pass reinforcing filter means for reinforcing low frequency components of said control signal.

63. A speed controller of a motor according to claim 60, wherein P and kf are mutually different constants.

64. A speed controller of a motor according to claim 63, wherein said control signal generation means includes low-pass reinforcing filter means for reinforcing low frequency components of said control signal.

65. A speed controller of a motor according to claim 63, wherein said driving means includes low-pass reinforcing filter means for reinforcing low frequency components of said control signal.

66. A speed controller of a motor comprising:
rotation sensor means for generating an A.C. signal having a period in accordance with a rotating speed of a motor;
speed detection means for effecting detection of the rotating speed of said motor a plurality of times per each revolution of said motor by using the A.C. signal of said rotation sensor means;

compensation means for generating a control signal by first and second calculation means which operate substantially concurrently, in accordance with a detection signal of said speed detection means; and driving means for driving said motor in accordance with said control signal of said compensation means;

wherein said first calculation means includes:

rotation error detection means for obtaining a rotation error responsive to the detection signal of said speed detection means;

control signal generation means for generating said control signal by calculating and synthesizing a memory output value produced by said second calculation means and the rotation error of said rotation error detection means; and operation timing generation means for generating a timing signal of said second calculation means; and wherein said second calculation means includes:

memory means for storing four or more memory values;

memory output value generation means for generating said memory Output value by the use of at least one memory value stored in said memory means;

synthetic error generation means for generating a synthetic error by synthesizing a plurality of rotation errors of said rotation error detection means;

renewing and storing means for renewing and storing substantially sequentially the memory value of said memory means by a renewed value corresponding to the value obtained by calculating and synthesizing the memory output value of said memory output value generation means and the synthetic error of said synthetic error generation means whenever said speed detection means effects the detection operation Q times (where Q is an integer of 2 or more); and operation management means for effecting the operation of said second calculation means by the timing signal of said operation timing generation means.

67. A speed controller of a motor according to claim 66, wherein said operation management means of said second calculation means includes monitor means for monitoring the timing signal of said operation timing generation means of said first calculation means.

68. A speed controller of a motor according to claim 66, wherein the operation of said first calculation means is effected by:

first instruction memory means storing therein in advance a series of calculation operations;

first digital value memory means storing therein a plurality of digital values;

first address generation means for generating the address of said first instruction memory means; and first calculation execution means for effecting the operation of said first calculation means in accordance with the instruction stored in said first instruction memory means;

wherein the operation of said second calculation means is effected by:

second instruction memory means storing therein in advance a series of calculation operations;

second digital value memory means storing therein a plurality of digital values;

second address generation means for generating the address of said second instruction memory means; and second calculation execution means for effecting the operation of said second calculation means in accordance with the instruction stored in said second instruction memory means; and wherein said operation management means of said second calculation means changes the content of said second address generation means of said second calculation means in accordance with the timing signal generated by said operation timing generation means of said first calculation means to the address which is in advance set, so as to effect the operation of said second calculation means.

69. A speed controller of a motor according to claim 68, wherein said first memory means and said second memory means are used in common between said first calculation means and said second calculation means.

70. A speed controller of a motor according to claim 68, wherein said first digital value memory means and said second digital value memory means are used in common between said first calculation means and said second calculation means.

71. A speed controller of a motor according to claim 68, wherein said first calculation execution means and said second calculation execution means are used in common between said first calculation means and said second calculation means.

72. A speed controller of a motor according to claim 68, wherein the operation of said first calculation means is effected by:

first instruction memory means storing therein in advance a series of calculation operations;

first digital value memory means storing therein a plurality of digital values;

first address generation means for generating the address of said first instruction memory means; and first calculation execution means for effecting the operation of said first calculation means in accordance with the instruction stored in said first instruction memory means;

wherein the operation of said second calculation means is effected by:

second instruction memory means storing therein in advance a series of calculation operations;

second digital value memory means storing therein a plurality of digital values;

second address generation means for generating the address of said second instruction memory means; and second calculation execution means for effecting the operation of said second calculation means in accordance with the instruction stored in said second instruction memory means; and wherein said operation management means of said second calculation means includes monitor means for monitoring a timing signal of said operation timing generation means of said first calculation means.

73. A speed controller of a motor according to claim 72, wherein said first instruction memory means and said second instruction memory means are used in common between said first calculation means and said second calculation means.

74. A speed controller of a motor according to claim 72, wherein said first digital value memory means and said second digital value memory means are used in common between said first calculation means and said second calculation means.

75. A speed controller of a motor according to claim 72, wherein said first calculation execution means and said second calculation execution means are used in common between said first calculation means and said second calculation means.

76. A speed controller of a motor according to claim 66, wherein said control signal generation means includes low-pass reinforcing filter means for reinforcing low frequency components of said control signal.

77. A speed controller of a motor according to claim 76, wherein said operation management means of said second calculation means includes monitor means for monitoring the timing signal of said operation timing generation means of said first calculation means.

78. A speed controller of a motor according to claim 76, wherein the operation of said first calculation means is effected by:
   first instruction memory means storing therein in advance a series of calculation operations;
   first digital value memory means storing therein a plurality of digital values;
   first address generation means for generating the address of said first instruction memory means; and
   first calculation execution means for effecting the operation of said first calculation means in accordance with the instruction stored in said first instruction memory means;
wherein the operation of said second calculation means is effected by:
   second instruction memory means storing therein in advance a series of calculation operations;
   second digital value memory means storing therein a plurality of digital values;
   second address generation means for generating the address of said second instruction memory means; and
   second calculation execution means for effecting the operation of said second calculation means in accordance with the instruction stored in said second instruction memory means; and
wherein said operation management means of said second calculation means changes the content of said second address generation means of said second calculation means in accordance with the timing signal of said operation timing generation means of said first calculation means to the address which is set in advance, so as to effect the operation of said second calculation means.

79. A speed controller of a motor according to claim 78, wherein said first instruction memory means and said second instruction memory means are used in common between said first calculation means and said second calculation means.

80. A speed controller of a motor according to claim 78, wherein said first digital value memory means and second digital value memory means are used in common between said first calculation means and said second calculation means.

81. A speed controller of a motor according to claim 78, wherein said first calculation execution means and said second calculation execution means are used in common between said first calculation means and said second calculation means.

82. A speed controller of a motor according to claim 76, wherein the operation of said first calculation means is effected by:
   first instruction memory means storing therein in advance a series of calculation operations;
   first digital value memory means storing therein a plurality of digital values;
   first address generation means for generating the address of said first instruction memory means; and
   first calculation execution means for effecting the operation of said first calculation means in accordance with the instruction stored in said first instruction memory means;
wherein the operation of said second calculation means is effected by:
   second instruction memory means storing therein in advance a series of calculation operations;
   second digital value memory means storing therein a plurality of digital values;
   second address Generation means for generating the address of said second instruction memory means; and
   second calculation execution means for effecting the operation of said second calculation means in accordance with the instruction stored in said second instruction memory means; and
wherein said operation management means of said second calculation means includes monitor means for monitoring the timing signal of said operation timing generation means of said first calculation means.

83. A speed controller of a motor according to claim 82, wherein said first instruction memory means and said second instruction memory means are used in common between said first calculation means and said second calculation means.

84. A speed controller of a motor according to claim 82, wherein said first digital value memory means and said second digital value memory means are used in common between said first calculation means and said second calculation means.

85. A speed controller of a motor according to claim 82, wherein said first calculation execution means and said second calculation execution means are used in common between said first calculation means and said second calculation means.

86. A speed controller of a motor according to claim 66, wherein said driving means includes low-pass reinforcing filter means for reinforcing low frequency components of said control signal.

87. A speed controller of a motor according to claim 86, wherein said operation management means of said second calculation means includes monitor means for monitoring the timing signal of said operation timing generation means of said first calculation means.

88. A speed controller of a motor according to claim 86, wherein the operation of said first calculation means is effected by:
   first instruction memory means storing therein in advance a series of calculation operations;
   first digital value memory means storing therein a plurality of digital values;
   first address generation means for generating the address of said first instruction memory means; and
   first calculation execution means for effecting the operation of said first calculation means in accordance with the instruction stored in said first instruction memory means;
wherein the operation of said second calculation means is effected by:
   second instruction memory means storing therein in advance a series of calculation operations;

second digital value memory means storing therein a plurality of digital values;

second address generation means for generating the address of said second instruction memory means; and second calculation execution means for effecting the operation of said second calculation means in accordance with the instruction stored in said second instruction memory means; and wherein said operation management means of said second calculation means changes the content of said second address generation means of said second calculation means in accordance with the timing signal of said operation timing generation means of said first calculation means to the address which is set in advance, so as to effect the operation of said second calculation means.

89. A speed controller of a motor according to claim 88, wherein said first instruction memory means and said second instruction memory means are used in common between said first calculation means and second calculation means.

90. A speed controller of a motor according to claim 88, wherein said first digital value memory means and said second digital value memory means are used in common between said first calculation means and said second calculation means.

91. A speed controller of a motor according to claim 88, wherein said first calculation execution means and said second calculation execution means are used in common between said first calculation means and said second calculation means.

92. A speed controller of a motor according to claim 86, wherein the operation of said first calculation means is effected by:
first instruction memory means storing therein in advance a series of calculation operations;
first digital value memory means storing therein a plurality of digital values;
first address generation means for generating the address of said first instruction memory means; and
first calculation execution means for effecting the operation of said first calculation means in accordance with the instruction stored in said first instruction memory means;
wherein the operation of said calculation means is effected by:
second instruction memory means storing therein in advance a series of calculation operations;
second digital value memory means storing therein a plurality of digital values;
second address generation means for generating the address of said second instruction memory means; and
second calculation execution means for effecting the operation of said second calculation means in accordance with the instruction stored in said second instruction memory means; and
wherein said operation management means of said second calculation means includes monitor means for monitoring the timing signal of said operation timing generation means of said first calculation means.

93. A speed controller of a monitor according to claim 92, wherein said first instruction memory means and said second instruction memory means are used in common between said first calculation means and said second calculation means.

94. A speed controller of a motor according to claim 92, wherein said first digital value memory means and said second digital value memory means are used in common between said first calculation means and said second calculation means.

95. A speed controller of a motor according to claim 92, wherein said first calculation execution means and second calculation execution means are used in common between said first calculation means and said second calculation means.

96. A speed controller of a motor according to claim 66, wherein said low-pass reinforcing filter means for reinforcing low frequency components of said control signal includes:
integration means for integrating said control signals and generating an integrated control signal; and
filter synthesis means for adding a value corresponding to said integrated control signal to said control signal and generating a new control signal;
wherein said first calculation means includes:
said filter synthesis means; and
wherein said second calculation means includes;
said integration means.

97. A speed controller of a motor according to claim 96, wherein said operation management means of said second calculation means includes monitor means for monitoring the timing signal of said operation timing generation means of said first calculation means.

98. A speed controller of a motor according to claim 96, wherein the operation of said first calculation means is effected by:
first instruction memory means storing therein in advance a series of calculation operations;
first digital value memory means storing therein a plurality of digital values;
first address generation means for generating the address of said first instruction memory means; and
first calculation execution means for effecting the operation of said first calculation means in accordance with the instruction stored in said first instruction memory means;
wherein the operation of said second calculation means is effected by:
second instruction memory means storing therein in advance a series of calculation operations;
second digital value memory means storing therein a plurality of digital values;
second address generation means for generating the address of said second instruction memory means; and
second calculation execution means for effecting the operation of said second calculation means in accordance with the instruction stored in said second instruction memory means; and
wherein said operation management means of said second calculation means changes the content of said second address generation means of said second calculation means in accordance with the timing signal of said operation timing generation means of said first calculation means to a value which is set in advance, so as to effect the operation of said calculation means.

99. A speed controller of a motor according to claim 98, wherein said first instruction memory means and said second instruction memory means are used in common between said first calculation means and said second calculation means.

100. A speed controller of a motor according to claim 98, wherein said first digital value memory means and said second digital value memory means are used in common between said first calculation means and said second calculation means.

101. A speed controller of a motor according to claim 98, wherein said first calculation execution means and said second calculation execution means are used in common between said first calculation means and said second calculation means.

102. A speed controller of a motor according to claim 96, wherein the operation of said first calculation means is effected by:
   first instruction memory means storing therein in advance a series of calculation operation;
   first digital value memory means storing therein a plurality of digital values;
   first address generation means for generating the address of said first instruction memory means; and
   first calculation execution means for effecting the operation of said first calculation means in accordance with the instruction stored in said first instruction memory means;
wherein the operation of said second calculation means in effected by:
   second instruction memory means storing therein in advance a series of calculation operations;
   second digital value memory means storing therein a plurality of digital values;
   second address generation means for generating the address of said second instruction memory means; and
   second calculation execution means for effecting the operation of said second calculation means in accordance with the instruction stored in said second instruction memory means; and
wherein said operation management means of said second calculation means includes monitor means for monitoring the timing signal of said operation timing generation means of said first calculation means.

103. A speed controller of a motor according to claim 102, wherein said first instruction memory means and said second instruction memory means are used in common between said first calculation means and said second calculation means.

104. A speed controller of a motor according to claim 102, wherein said first digital value memory means and said second digital value memory means are used in common between said first calculation means and said second calculation means.

105. A speed controller of a motor according to claim 102, wherein said first calculation execution means and said second calculation execution means are used in common between said first calculation means and said second calculation means.

* * * * *